United States Patent
Araki et al.

(10) Patent No.: US 11,927,120 B2
(45) Date of Patent: Mar. 12, 2024

(54) EXHAUST GAS SENSOR

(71) Applicant: DENSO CORPORATION, Kariya (JP)

(72) Inventors: Takashi Araki, Kariya (JP); Masato Katsuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/237,248

(22) Filed: Apr. 22, 2021

(65) Prior Publication Data

US 2021/0239026 A1 Aug. 5, 2021

Related U.S. Application Data

(63) Continuation of application No. PCT/JP2019/040351, filed on Oct. 14, 2019.

(30) Foreign Application Priority Data

Oct. 24, 2018 (JP) .................. 2018-200243

(51) Int. Cl.
  *F01N 3/00* (2006.01)
  *F01N 3/023* (2006.01)
  *F01N 11/00* (2006.01)
  *F01N 13/00* (2010.01)

(52) U.S. Cl.
  CPC .............. *F01N 11/00* (2013.01); *F01N 3/023* (2013.01); *F01N 13/008* (2013.01); *F01N 2560/02* (2013.01); *F01N 2560/20* (2013.01)

(58) Field of Classification Search
  CPC ........ F01N 11/00; F01N 3/023; F01N 13/008; F01N 2560/02; F01N 2560/20; F01N 2900/0602; F01N 2550/00; F01N 2900/1404; F01N 3/18
  See application file for complete search history.

(56) References Cited

U.S. PATENT DOCUMENTS

| | | | |
|---|---|---|---|
| 2002/0060150 A1* | 5/2002 | Hashimoto | G01N 33/007 205/784.5 |
| 2009/0090622 A1 | 4/2009 | Ripley | |
| 2010/0031733 A1* | 2/2010 | Bollinger | G01N 15/0656 73/28.04 |
| 2011/0015824 A1 | 1/2011 | Ante | |

(Continued)

FOREIGN PATENT DOCUMENTS

| | | |
|---|---|---|
| JP | 2008-231994 | 10/2008 |
| JP | 2011-017289 | 1/2011 |

*Primary Examiner* — Matthew T Largi
(74) *Attorney, Agent, or Firm* — Nixon & Vanderhye P.C.

(57) ABSTRACT

An exhaust gas sensor includes an element cover, a heater, a heater control section, and a cover state diagnosing section. The element cover accommodates a sensor element including a detection section and includes one or more gas flow holes. The heater heats the sensor element. The heater control section controls how the heater heats the sensor element. The cover state diagnosing section diagnoses a state of the element cover using heater information obtained when the heater is operated by the heater control section. The cover state diagnosing section includes a diagnosability determining section, which determines whether the state of the element cover is diagnosable based on an accuracy of the heater information obtained from an operating state of the heater and a surrounding environmental state of the element cover.

16 Claims, 19 Drawing Sheets

(56) References Cited

U.S. PATENT DOCUMENTS

| | | | |
|---|---|---|---|
| 2011/0048106 A1 | 3/2011 | Zawacki et al. | |
| 2011/0163761 A1* | 7/2011 | Yokoi | G01N 33/007 |
| | | | 324/601 |
| 2011/0283773 A1* | 11/2011 | Suzuki | G01N 15/0656 |
| | | | 73/25.05 |
| 2012/0031169 A1* | 2/2012 | Sakamoto | G01N 15/0656 |
| | | | 73/25.05 |
| 2012/0186330 A1* | 7/2012 | Ueno | G01N 15/0656 |
| | | | 73/23.33 |
| 2012/0291632 A1* | 11/2012 | Nishijima | G01M 15/106 |
| | | | 73/114.71 |
| 2013/0145815 A1 | 6/2013 | Nishijima | |
| 2014/0363341 A1* | 12/2014 | Shirasawa | F01N 3/2066 |
| | | | 422/119 |
| 2016/0356693 A1* | 12/2016 | Tylutki | F01N 11/002 |
| 2018/0135493 A1* | 5/2018 | Takaoka | F01N 3/0275 |

\* cited by examiner (FLOW RATE OF PART OF EXHAUST GAS 25m/s)

(TEMPERATURE OF PART OF EXHAUST GAS 150°C)

EXHAUST GAS SENSOR

CROSS-REFERENCE TO RELATED APPLICATION

The present application is a continuation application of International Application No. PCT/JP2019/040351, filed on Oct. 14, 2019, which claims priority to Japanese Patent Application No. 2018-200243, filed on Oct. 24, 2018. The contents of these applications are incorporated herein by reference in their entirety.

BACKGROUND

Technical Field

The present disclosure relates to an exhaust gas sensor for detecting a component included in exhaust gas.

Background Art

Exhaust gas sensors are used for detecting a specific gas component (such as NOx) and particulate matter (hereinafter, referred to as PM as required) contained in exhaust gas from, for example, a vehicle engine. An exhaust gas sensor is generally mounted in such a manner that the distal end of a sensor element, which is supported by a housing, is located in the exhaust gas passage with the sensor element accommodated in an element cover.

SUMMARY

In the present disclosure, provided is an exhaust gas sensor as the following.

The exhaust gas sensor including: a sensor element; an element cover that accommodates the sensor element; a heater; a heater control section configured to control how the heater heats the sensor element; and a cover state diagnosing section configured to diagnose a state of the element cover using heater information obtained when the heater is operated by the heater control section, the cover state diagnosing section comprising a diagnosability determining section configured to determine whether the state of the element cover is diagnosable based on an accuracy of the heater information obtained from an operating state of the heater and a surrounding environmental state of the element cover.

BRIEF DESCRIPTION OF THE DRAWINGS

The above-mentioned and other objects, features, and advantages of this disclosure will become more apparent by reference to the following description taken in conjunction with the accompanying drawings, in which.

DETAILED DESCRIPTION OF THE PREFERRED EMBODIMENTS

Figure 1:
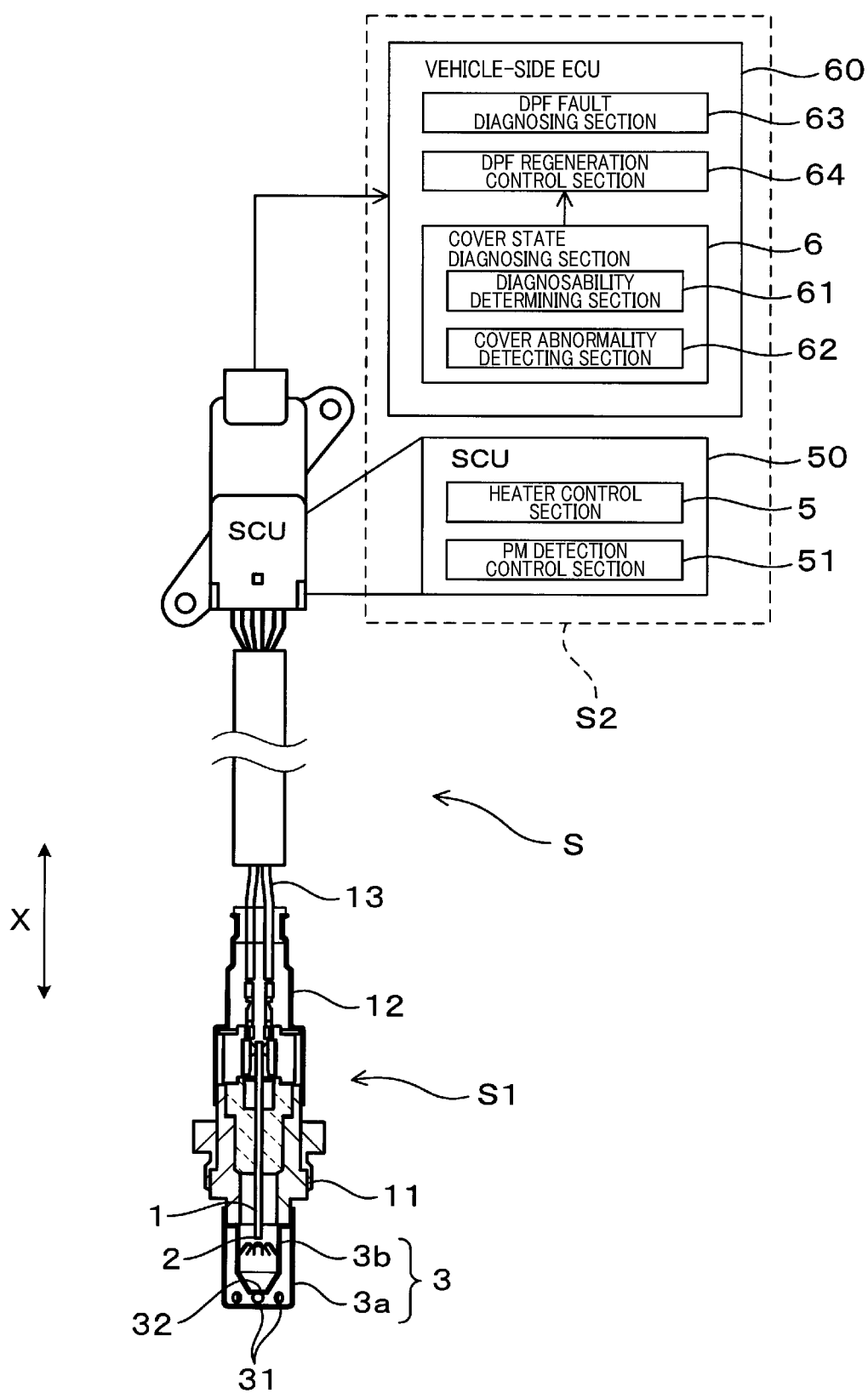
FIG. 1 is a view illustrating a general arrangement of an exhaust gas sensor according to a first embodiment.

In recent years, increasingly stringent emission regulations on vehicle engines necessitate detecting a fault also in exhaust gas sensors. For example, an exhaust gas purifying system including a particulate filter for collecting particulate matter includes a PM sensor, which detects the particulate matter that leaks when, for example, the particulate filter is damaged. If the PM sensor is not operating properly, erroneous detection may possibly occur. To increase the reliability of the system, it is necessary to detect whether there is an abnormality in the PM sensor itself.

One of the factors that deteriorate the function of the sensor includes an abnormality in the element cover. For example, if the cover is clogged or has become detached, the state of the exhaust gas that is introduced to the sensor element changes, which hinders proper output. In this regard, PTL 1 proposes a PM sensor that includes clogging detecting means that detects the clogging of air holes in the element cover. The clogging detecting means uses the temperature of the sensor element to be capable of performing detection even during the time period when the sensor element is in a dead zone. For example, it is determined that clogging has occurred if the change rate of the temperature when the sensor element is heated by a heater is greater than a predetermined value or if the difference between the temperature of the exhaust gas upstream the sensor element and the temperature of the sensor element is greater than a predetermined value.

[PTL1] International Publication 2012/032622

As in PTL 1, for example, in a case in which the determination is made based on the temperature of the sensor element, a heater for heating the sensor element needs to be functioning properly. If deterioration or the like of the heater occurs, the accuracy of the determination decreases. Furthermore, for example, if the surrounding environment fluctuates in accordance with the operating condition of the engine, the state in which gas hits the sensor element changes, which affects the temperature change of the sensor element when the sensor element is heated with the heater. This may possibly cause erroneous detection. As described above, it is difficult to determine the state of the cover using, for example, the temperature of the sensor element, which is affected by the surrounding environment.

It is an object of the present disclosure to provide a highly reliable exhaust gas sensor that is capable of accurately diagnosing the state of an element cover that protects a sensor element.

One aspect of the present disclosure includes an exhaust gas sensor, the exhaust gas sensor including: a sensor element including a detection section configured to detect a specific component contained in exhaust gas; an element cover that accommodates the sensor element and includes one or more gas flow holes for letting the exhaust gas in and out of the element cover; a heater configured to heat the sensor element when energized; a heater control section configured to control how the heater heats the sensor element; and a cover state diagnosing section configured to diagnose a state of the element cover using heater information obtained when the heater is operated by the heater control section, the cover state diagnosing section comprising a diagnosability determining section configured to determine whether the state of the element cover is diagnosable based on an accuracy of the heater information obtained from an operating state of the heater and a surrounding environmental state of the element cover.

In the above-described exhaust gas sensor, the cover state diagnosing section determines whether the element cover can be diagnosed by the diagnosability determining section prior to diagnosing the state of the element cover using the information on the heater that heats the sensor element. In doing so, it is determined whether the heater information is accurate based on both the operating state of the heater and the surrounding environment of the element cover. For example, it is determined that the element cover can be diagnosed if it is determined that the heater for heating the sensor element can be operated properly and the influence of the surrounding environment of the element cover is small on diagnosing the state of the cover using the heater information. Consequently, the state of the cover is diagnosed with the sensor element and the surrounding environment in good conditions, so that erroneous detection is prevented.

As described above, the above aspect provides a highly reliable exhaust gas sensor that can accurately diagnose the state of an element cover that protects a sensor element.

First Embodiment

An exhaust gas sensor according to an embodiment will be described with reference to FIGS. 1 to 14.

Figure 2:
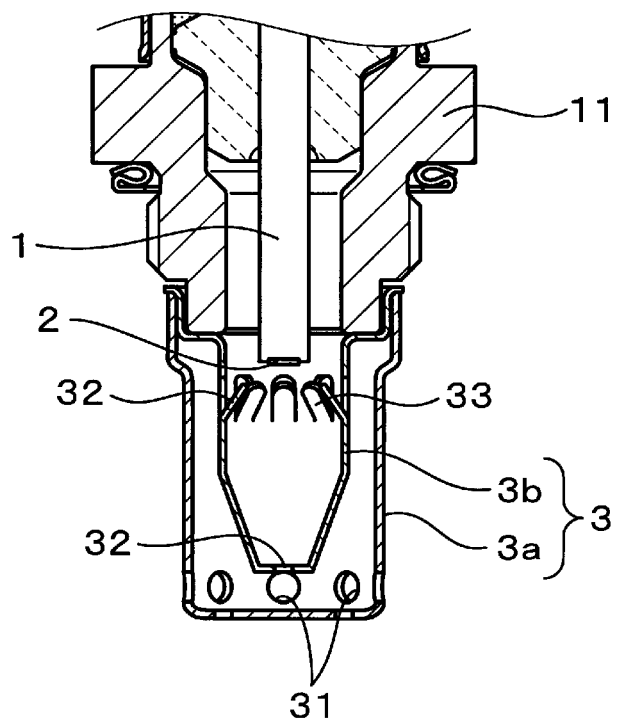
FIG. 2 is an enlarged cross-sectional view of the main section of a sensor body of the exhaust gas sensor according to the first embodiment.
Figure 3:
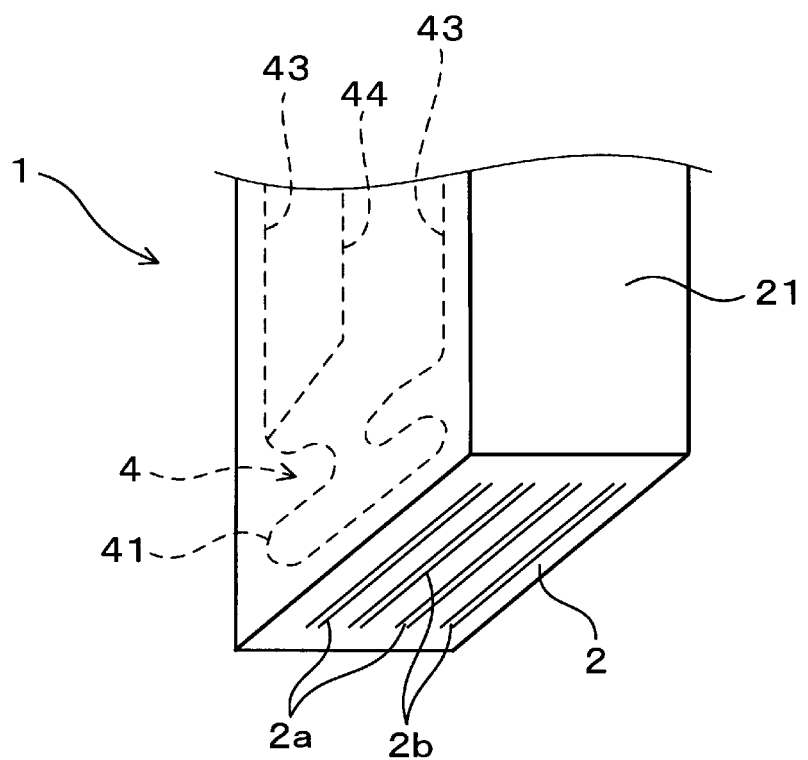
FIG. 3 is an enlarged perspective view of the main section of a sensor element of the exhaust gas sensor according to the first embodiment.
Figure 4:
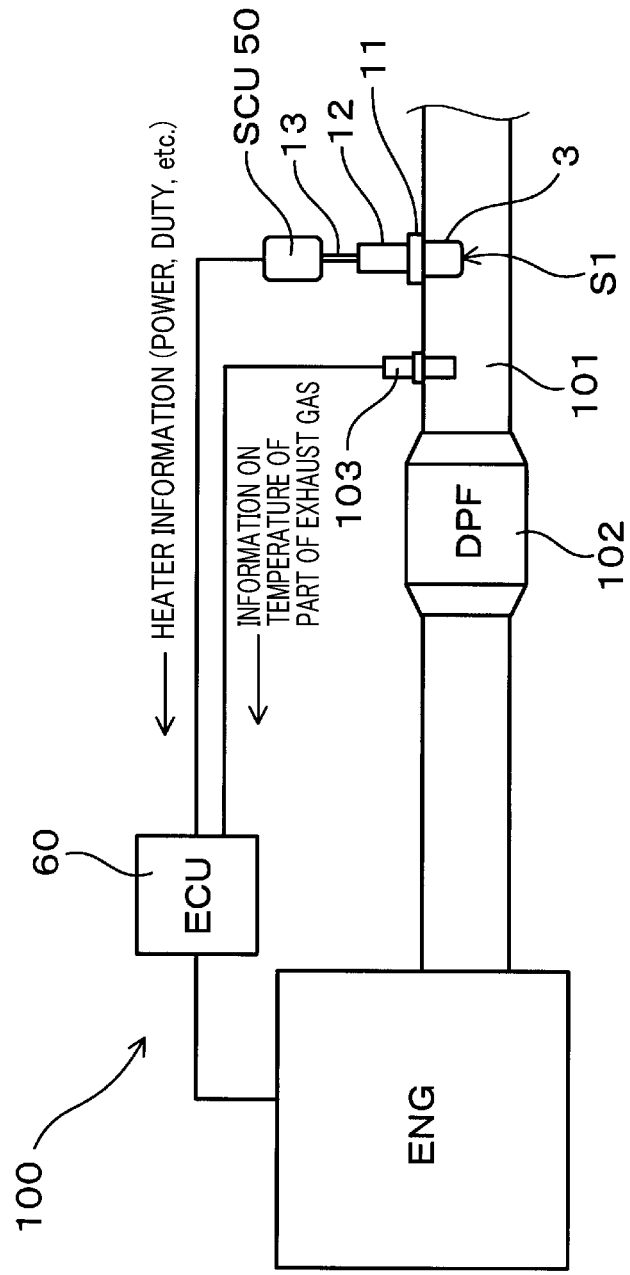
FIG. 4 is a diagram illustrating a general arrangement of an exhaust gas purifying system including the exhaust gas sensor according to the first embodiment.

As shown in FIGS. 1 to 3, an exhaust gas sensor S includes a sensor body S1 and a controller S2 and is applied to, for example, an exhaust gas purifying device 100 for a vehicle shown in FIG. 4. The sensor body S1 includes a sensor element 1, which includes a detection section 2, an element cover 3, which accommodates the sensor element 1, and a heater 4, which heats the sensor element 1 when energized. The controller S2 includes a heater control section 5, which controls the heating of the sensor element 1 by the heater 4, and a cover state diagnosing section 6, which diagnoses the state of the element cover 3.

The sensor element 1 is shaped like an elongated rectangular parallelepiped and extends in an axial direction X of the sensor body S1. In this description, the vertical direction in FIG. 1 is referred to as the axial direction X. The lower end in the axial direction X is referred to as the distal end of the sensor body S1, and the upper end in the axial direction X is referred to as the proximal end of the sensor body S1. The detection section 2 is located on the distal end of the sensor element 1 in the axial direction X and detects a specific component contained in exhaust gas. Examples of the specific component include particulate matter (hereinafter, simply referred to as the PM as required) included in exhaust gas discharged from, for example, a vehicle engine, and a gas component such as NOx.

The exhaust gas purifying device 100 shown in FIG. 4 is an example of using the exhaust gas sensor S as a PM sensor for detecting the specific component, which is the particulate matter in this case.

The element cover 3 protects the sensor element 1 from, for example, poisoning substances and condensed water in the exhaust gas and includes gas flow holes 31 and 32 to let the exhaust gas in and out of the internal space. The sensor element 1 includes the heater 4 for heating the sensor element 1 (for example, refer to FIG. 3) and is connected to a vehicle-side electronic control unit (hereinafter, referred to as the ECU) 60, which includes the cover state diagnosing section 6, through a sensor control unit (hereinafter, referred to as the SCU) 50, which includes the heater control section 5.

The cover state diagnosing section 6 diagnoses the state of the element cover 3 using heater information obtained when the heater 4 is operated. The cover state diagnosing section 6 includes a diagnosability determining section 61, which determines whether the state of the element cover 3 can be diagnosed based on the accuracy of the heater information obtained from the operating state of the heater 4 and the surrounding environmental state of the element cover 3.

In doing so, the diagnosability determining section 61 determines whether the heater information is accurate based on whether the heater 4 is ready to operate normally and whether the surrounding environmental state is in a state that allows the state of the element cover 3 to be diagnosed.

More specifically, the diagnosability determining section 61 determines that the state of the element cover 3 can be diagnosed if it is determined that the heater 4 is ready to operate normally based on resistance value information on the heater 4 or temperature information on the sensor element 1, and additionally if it is determined that the surrounding environmental state based on exhaust gas information on the exhaust gas around the element cover 3 is in a state that allows diagnosing the state of the element cover.

If it is determined that the state of the element cover can be diagnosed by the diagnosability determining section 61, the cover state diagnosing section 6 compares the heater information with diagnosis threshold values A and B that are previously set at a heater information determining section 62. Examples of the heater information include the amount of electric power supplied to the heater 4 and the control amount by the heater control section 5. The state of the element cover 3 can be diagnosed based on the determination results of the comparison between the heater information and the diagnosis threshold values A and B.

Next, the structure of the exhaust gas sensor S will be described in detail.

In FIG. 1, the sensor body S1 of the exhaust gas sensor S accommodates the sensor element 1 inside a tubular housing 11 and includes the element cover 3, which is cup-shaped and is secured to the distal end of the housing 11 in the axial direction X, and a tubular atmosphere cover 12, which is secured to the other end. The housing 11 is mounted on, for example, an exhaust gas pipe 101 of the exhaust gas purifying device 100 shown in FIG. 4 with the distal end of the sensor element 1, which is covered with the element cover 3, projecting inside the exhaust gas pipe 101. The atmosphere cover 12 covers the proximal end of the sensor element 1 located outside the exhaust gas pipe 101. The sensor element 1 is electrically connected to the sensor control unit 50 through a lead wire 13 that is drawn out from the proximal end of the atmosphere cover 12.

As shown by an example in FIGS. 2 and 3, the sensor element 1 is, for example, a laminated element having a laminated structure. The distal end face of an insulating substrate 21, which is shaped like a flat rectangular parallelepiped, is the detection section 2. The detection section 2 includes a plurality of linear electrodes serving as a pair of detection electrodes 2a and 2b respectively. The detection electrodes 2a and 2b are alternately arranged so that the detection electrodes 2a and 2b with different polarities constitute pairs of electrodes. The detection section 2 is formed by, for example, alternately placing electrode films, which serve as the detection electrodes 2a and 2b, between insulative sheets, which constitute the insulating substrate 21, and firing the thus formed laminate to integrate them. At this time, the edge of each electrode film at least part of which is embedded in the insulating substrate 21 is linearly exposed on the distal end face of the insulating substrate 21. The exposed parts of the electrode films constitute the detection electrodes 2a and 2b. The insulating substrate 21 is formed of, for example, an insulating ceramic material such as alumina.

The insulating substrate 21 embeds non-illustrated leads, which are connected to the pair of detection electrodes 2a and 2b. The leads are drawn out from the proximal end of the sensor element 1 and are connected to a PM detection control section 51 of the SCU 50 through the lead wire 13 (refer to FIG. 1). The PM detection control section 51 includes, for example, a voltage application circuit for applying a PM detection voltage across the pair of detection electrodes 2a and 2b and electrostatically collects the PM between the pair of detection electrodes 2a and 2b during a predetermined detection time period.

Figure 5:
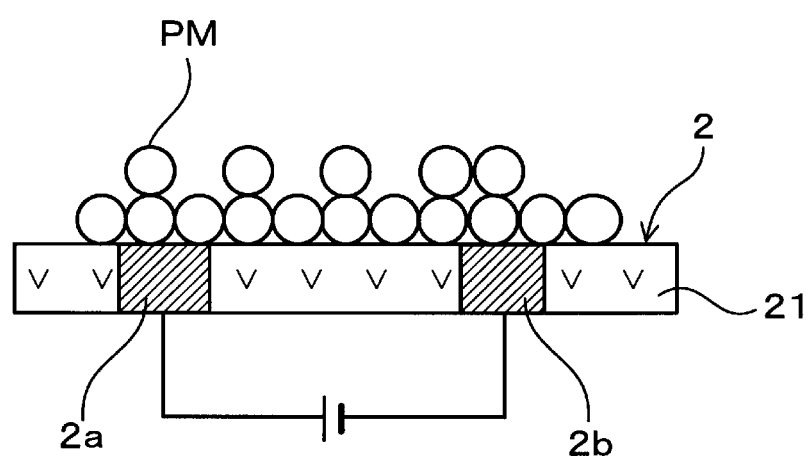
FIG. 5 is a schematic cross-sectional view for explaining operation of the sensor element according to the first embodiment.

The principle of detecting the PM will be described with reference to the schematic diagram shown in FIG. 5. The detection section 2 of the sensor element 1 includes the pair of detection electrodes 2a and 2b located on the surface of the insulating substrate 21 to face each other with a predetermined interval in between. The pair of detection electrodes 2a and 2b are not conductive in the initial state. If a predetermined voltage is applied by the PM detection control section 51 during the PM detection time period, the PM is attracted by an electric field generated between the pair of detection electrodes 2a and 2b and gradually accumulates. If the pair of detection electrodes 2a and 2b becomes conductive due to the accumulation of the PM, the resistance value between the pair of detection electrodes 2a and 2b changes in accordance with the amount of the collected PM. Thus, the PM detection control section 51 can detect the current across the pair of detection electrodes 2a and 2b.

The insulating substrate 21 includes a heater electrode, which constitutes a heating section 41 of the heater 4, a pair of leads 42 and 43 for energizing to the heating section 41, and a detection lead 44, each of which is embedded in the vicinity of the distal end face on which the detection electrodes 2a and 2b are formed. The leads 42, 43, and 44 are drawn out from the proximal end of the sensor element 1 and are connected to the heater control section 5 of the SCU 50 through the lead wire 13 (refer to FIG. 1).

The heater control section 5 includes, for example, a pulse width modulation circuit, which controls the pulse width of a heater drive signal, and controls the amount of energization of the heating section 41 using a duty cycle of a pulse signal (hereinafter, referred to as the heater duty).

Thus, the heater control section 5 controls the amount of heat generated by the heater 4 and heats the sensor element 1 to a desired temperature. For example, prior to detecting the PM by the PM detection control section 51, the detection section 2 is heated to a temperature greater than or equal to a burning temperature of the PM to burn and remove the collected PM, so that the detection section 2 is returned to the initial state.

The element cover 3 is, for example, a double container that opens toward the housing 11 and includes an outer cover 3a and an inner cover 3b, which are located to be coaxial. The outer cover 3a includes a cylindrical body having a substantially uniform diameter and a distal end face that closes the cylindrical body. Multiple gas flow holes 31 are formed through the side surface of the cylindrical body close to the distal end, so that exhaust gas is let in from and out to the exhaust gas pipe 101. The inner cover 3b includes a gas flow hole 32 in the distal end face. The gas flow hole 32 connects the space inside the inner cover 3b and the space inside the outer cover 3a.

Additionally, multiple gas flow holes 32 are formed through the side surface of the inner cover 3b close to the proximal end. Each gas flow hole 32 includes a guide portion 33, which is tilted inward of the inner cover 3b. Thus, the exhaust gas introduced inside the outer cover 3a is guided along the outer surface of the inner cover 3b toward the proximal end and is introduced inside the inner cover 3b through the gas flow holes 32. The distal end of each guide portion 33 is located to face the detection section 2 of the sensor element 1, which is located on the axis of the inner cover 3b. After flowing toward the detection section 2, the exhaust gas introduced inside the inner cover 3b flows out through the gas flow hole 32 on the distal end face and merges with the flow of the exhaust gas that flows out of the outer cover 3a.

The gas flow holes 31 close to the distal end face of the outer cover 3a and the gas flow hole 32 on the distal end face of the inner cover 3b are, for example, circular holes. The gas flow holes 32 close to the proximal end of the inner cover 3b are, for example, elongated holes extending in the axial direction X and are integrally formed with the elongated plate-like guide portions 33, which are formed by cutting the side surface of the inner cover 3b.

Note that, the shape of the outer cover 3a and the inner cover 3b and the shape of the gas flow holes 31 and 32 are not limited to the above-described shapes and may have any configuration. Furthermore, the gas flow holes 32 do not necessarily have to include the guide portions 33, and the number and position of the gas flow holes 31 and 32 may be set as required. The gas flow holes 31 and 32 are preferably located uniformly around the entire circumference of the side surface of the outer cover 3a or the inner cover 3b so as not to provide directionality to the gas flow.

As shown in FIG. 4, the exhaust gas sensor S of the present embodiment is applied to, for example, the exhaust gas purifying device 100 of a diesel engine (hereinafter, simply referred to as the engine) ENG. The sensor body S1 is mounted on the wall of the exhaust gas pipe 101 downstream of a diesel particulate filter (hereinafter, simply referred to as the DPF) 102. Half the sensor body S1 of the exhaust gas sensor S closer to the distal end in the axial direction X is located inside the exhaust gas pipe 101 to detect the particulate matter that leaks from the DPF 102 and transmits to the SCU 50. A temperature sensor 103 is located between the DPF 102 and the sensor body S1 to detect the temperature of the gas inside the exhaust gas pipe 101 downstream of the DPF 102. The detection signal of the temperature sensor 103 is transmitted to the ECU 60 as exhaust gas information.

The ECU 60 receives heater duty information from the heater control section 5 of the SCU 50 and PM detection information from the PM detection control section 51 besides information on the temperature of the part of the exhaust gas from the temperature sensor 103. Furthermore, the ECU 60 includes a DPF regeneration control section 63, which controls regeneration of the DPF 102, and a DPF fault diagnosing section 64, which diagnoses a fault in the DPF 102 (refer to FIG. 1). The DPF regeneration control section 63 determines, for example, whether the regeneration of the DPF 102 is necessary based on the operating condition of the vehicle or the like, and the DPF fault diagnosing section 64 determines, for example, whether there is a fault such as a crack in the DPF 102 based on the PM detection information.

The ECU 60 receives an intake air amount detected by a non-illustrated air flow meter and detection signals from, for example, an engine speed sensor and an accelerator position sensor. The ECU 60 learns the operating condition of the engine ENG based on the received information and controls the entire vehicle.

The exhaust gas information includes, besides the temperature of the part of the exhaust gas, information regarding the operation of the engine ENG, such as the flow rate of gas in the exhaust gas pipe 101, and the regeneration information on the DPF 102. The temperature of the part of the exhaust gas and the flow rate of the part of the exhaust gas may be detected values or estimated values estimated from, for example, the operating condition of the engine ENG.

The engine ENG does not necessarily have to be a diesel engine and may be a gasoline engine. In this case, a gasoline particulate filter (hereinafter, simply referred to as the GPF) is located instead of the DPF 102.

Next, the cover state diagnosing section 6 of the ECU 60 will be described in detail.

The PM detection information obtained by the exhaust gas sensor S is used mainly for diagnosing a fault in the DPF 102 by the DPF fault diagnosing section 64 of the ECU 60. To reliably detect a fault in the DPF 102, the exhaust gas sensor S needs to detect the PM properly. For the proper detection of the PM, in addition to the sensor element 1, the state of the element cover 3 that influences the operation of the sensor element 1 is also important.

For example, if clogging of the cover occurs due to, for example, adhesion and accumulation of particulate matter or the like in the gas flow holes 31 and 32 of the element cover 3, or because the gas flow holes 31 and 32 are intentionally or erroneously closed, the flow of gas is hindered, so that a sufficient amount of exhaust gas fails to reach the sensor element 1.

In such a case, even if a fault occurs in the DPF 102, a PM detection signal is not output from the sensor element 1. Thus, the fault determination is not performed nor an occupant is notified, which may possibly cause the particulate matter to be discharged to the outside of the vehicle. In the meantime, if the element cover 3 becomes broken and comes off or has become detached, the amount of exhaust gas that is introduced to the sensor element 1 increases, which may possibly cause erroneous detection.

To solve this problem, the exhaust gas sensor S is provided with the cover state diagnosing section 6 to be capable of diagnosing the state of the element cover 3 (hereinafter, referred to as the cover state diagnosis as required). The cover state diagnosis uses the heater information obtained when the heater 4 for heating the sensor element 1 is operated by the heater control section 5. Thus, the heater information determining section 62 determines the heater information using threshold values. In this case, in order to reliably determine the heater information using the threshold values, the heater 4 needs to be operating properly and to be in an environment in which the heater information is not influenced by external factors or the like. For this reason, the cover state diagnosing section 6 includes the diagnosability determining section 61, which determines whether the cover state diagnosis can be performed prior to the diagnosis that uses the heater information.

The overview of the procedure executed by the cover state diagnosing section 6 at this time will be described using FIG. 6. Steps S1 to S3 in FIG. 6 correspond to the diagnosability determining section 61 of the cover state diagnosing section 6, and steps S4 to S7 correspond to the heater information determining section 62.

Figure 6:
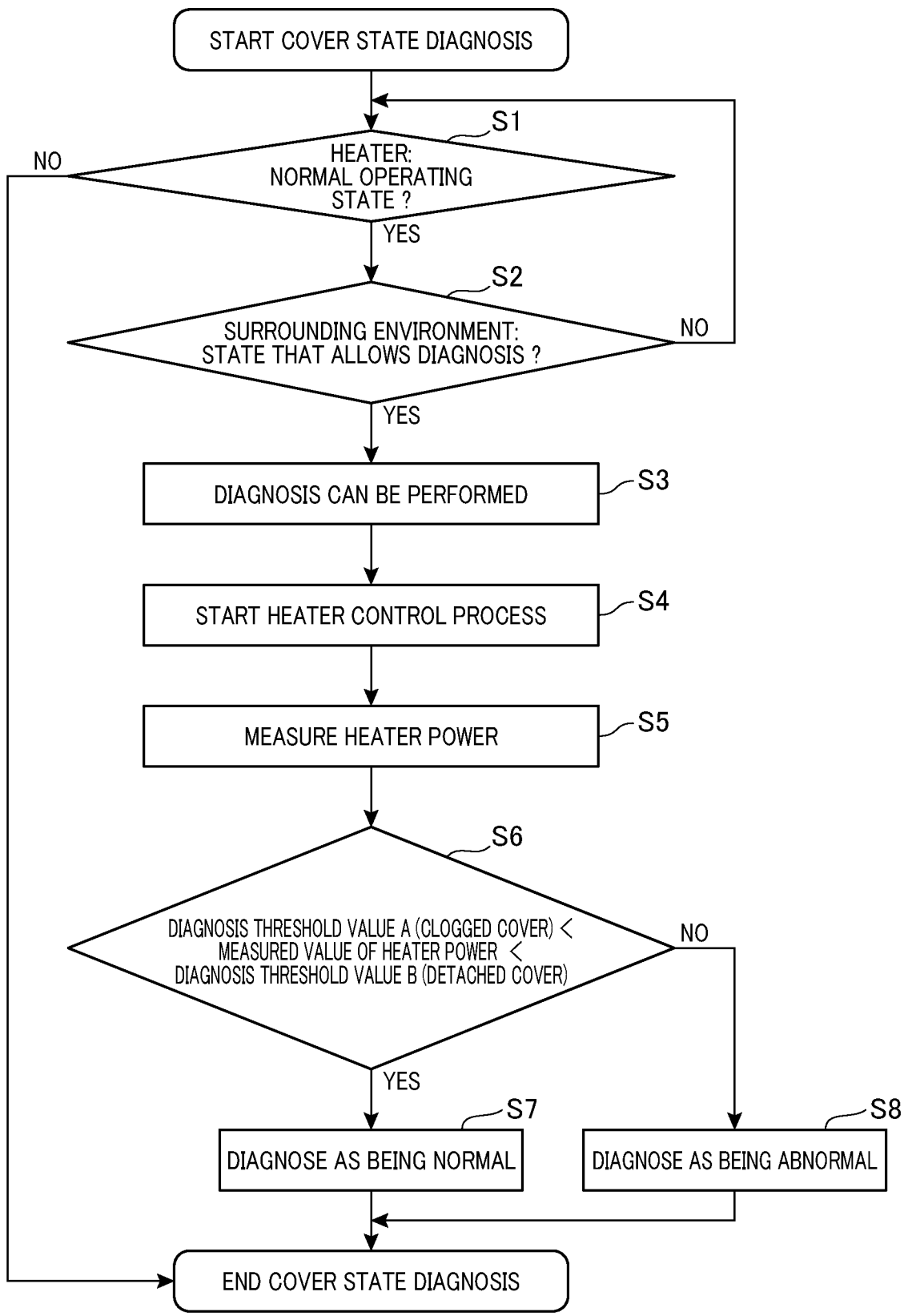
FIG. 6 is a flowchart of a cover state diagnosing process performed by a cover state diagnosing section of the exhaust gas sensor according to the first embodiment.

In FIG. 6, when the process for diagnosing the state of the element cover 3 is started, first, at step S1, it is determined whether the heater 4 is ready to operate normally (that is, heater: normal operating state?). If the outcome of step S1 is positive, the process proceeds to step S2, and if the outcome of step S1 is negative, it is determined that diagnosis cannot be performed, and the present routine is temporarily suspended.

At step S2, it is further determined whether the surrounding environmental state of the element cover 3 is a state that allows the state of the cover to be diagnosed reliably (that is, surrounding environment: state that allows diagnosis?). If the outcome of step S2 is positive, the process proceeds to step S3, and if the outcome is negative, the process returns to step S1 to repeat the following step until the state that allows diagnosis is achieved.

Steps S1 and S2 determine whether the heater 4, which is included in the sensor body S1 and heats the sensor element 1, functions properly (that is, the internal factor) and whether the surrounding environmental state of the sensor body S1, or more specifically, the temperature of the part of the exhaust gas and the flow rate of the part of the exhaust gas that flows inside the exhaust gas pipe 101 are in predetermined states suitable for diagnosing the state of the element cover 3 (that is, the external factor).

In the present embodiment, the accuracy of the heater information on the exhaust gas sensor S is determined based on both the internal and external factors, so that the state of the cover is diagnosed with higher reliability.

At step S3, it is determined that the cover state diagnosis can be performed since the outcomes of both steps S1 and S2 are positive. Subsequently, the process proceeds to step S4, and a heater control process is started. More specifically, the heater control section 5 energizes to the heater 4 and controls the amount of energization so that the detection section 2 of the sensor element 1 is kept at a predetermined target temperature. For example, the level of current supply is controlled by a PID control process based on the difference between the measured temperature and the target temperature. The temperature of the detection section 2 can be measured based on, for example, the relationship between the heater resistance and the sensor temperature (for example, refer to FIG. 12), which will be discussed below.

Furthermore, at step S5, the heater power, which is an example of the heater information, is measured, and the process proceeds to step S6. At step S6, the measured value of the heater power is compared with the diagnosis threshold value A and the diagnosis threshold value B. The diagnosis threshold value A is, for example, a lower limit threshold value at which whether an abnormality due to a clogged cover has occurred can be determined. The diagnosis threshold value B is, for example, an upper limit threshold value at which whether an abnormality due to a detached cover has occurred can be determined.

The heater information may be any information as long as the information allows detecting the abnormality of the heater 4 and may include a voltage or a current supplied to the heater 4 and the control amount of the heater control section 5 such as the heater duty.

Figure 7:
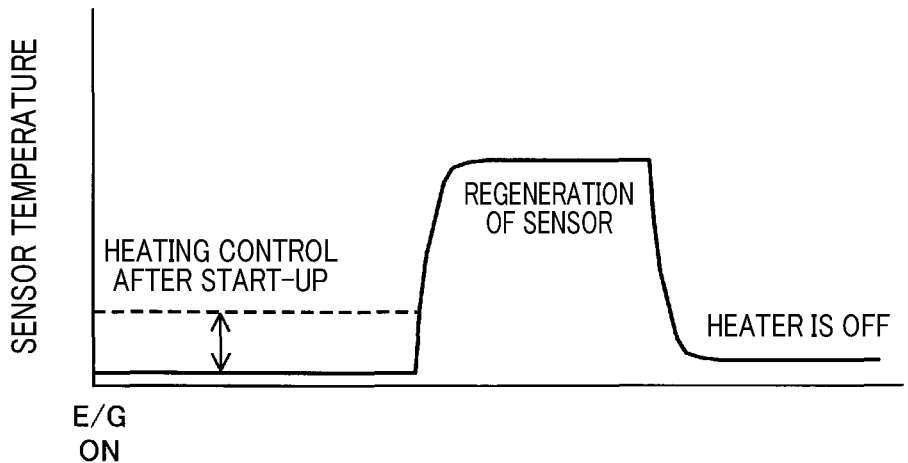
FIG. 7 is a timing chart showing heating control performed by a heater of the exhaust gas sensor according to the first embodiment and changes in the temperature of the sensor element.

As shown in FIG. 7, the temperature of the sensor element 1 (that is, the sensor temperature) after starting the engine ENG is heated to a temperature that allows removing the condensed water for, for example, a certain time period prior to the regeneration of the sensor for detecting the PM. At this time, the sensor body S1 is exposed to a temperature of the part of the exhaust gas lower than the temperature to which the sensor element 1 is heated. Thus, the heater controllability changes depending on the state of the element cover 3.

Figure 8:
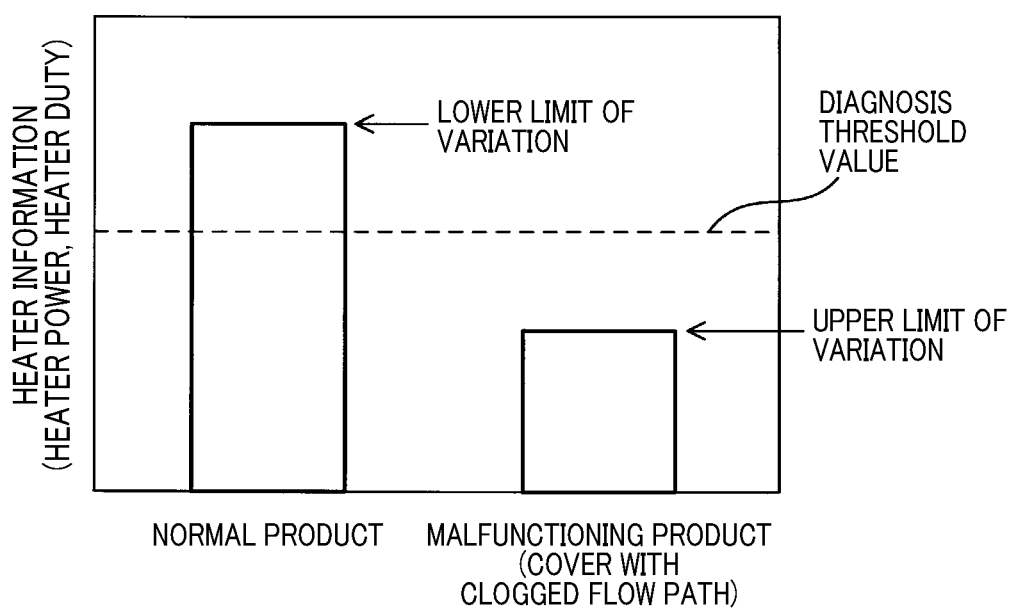
FIG. 8 is a graph showing the relationship between heater information and a diagnosis threshold value used by the cover state diagnosing section of the exhaust gas sensor according to the first embodiment, comparing a normal product with a product with a clogged cover.

For example, as shown in FIG. 8, the heater power supplied to the heating section 41 of the heater 4 (or the heater duty for controlling the heater power) during the heating control differs between a normal product with the element cover 3 in a normal state and a malfunctioning product with a clogged cover. This is because if the gas flow holes 31 and 32 of the element cover 3 are clogged, the exhaust gas is not introduced in the element cover 3, and the sensor element 1 is unlikely to be cooled. Thus, the heater power necessary for heating the sensor element 1 is decreased compared with a state in which the element cover 3 is normal. For example, when the heater power of the normal product is set as the lower limit of the variation, and the heater power of the malfunctioning product is set as the upper limit of the variation based on the relationship between the heater powers, the diagnosis threshold value A can be previously set based on heater power values between the lower and upper limits.

In the meantime, if the element cover 3 has become detached, the sensor element 1 is directly exposed to the exhaust gas, so that the sensor element 1 is exposed to a temperature of the part of the exhaust gas lower than the temperature to which the sensor element 1 is heated. In this case, compared with a state in which the element cover 3 is normal, the heater power necessary for heating the sensor element 1 is increased. Thus, in the same manner, the diagnosis threshold value B can be previously set based on the relationship between the heater powers.

Consequently, at step S6, whether the element cover 3 is in a normal state can be diagnosed by determining whether the measured value of the heater power is in a predetermined range greater than the diagnosis threshold value A, which is the lower limit, and less than the diagnosis threshold value B, which is the upper limit (that is, diagnosis threshold value A<measured value of heater power<diagnosis threshold value B). That is, if the outcome of step S6 is positive, the process proceeds to step S7, and the element cover 3 is diagnosed as being normal. If the outcome of step S6 is negative, the process proceeds to step S8, and the element cover 3 is diagnosed as being abnormal. After that, the present routine is temporarily suspended.

According to the present embodiment, since the cover state diagnosing section 6 includes the diagnosability determining section 61, the process moves to the heater information determining section 62 only when the heater 4 is functioning properly and when the surrounding environment does not affect the heater control process. That is, since the state of the cover is diagnosed accurately based on the heater information with the accuracy of the heater information, such as the heater power, being high, erroneous detection can be prevented, which improves the reliability.

Second Embodiment

In the present embodiment, the determining procedure performed by the diagnosability determining section 61 will be described in more detail using the flowcharts shown in FIGS. 9 to 15.

The reference numerals used in and after the second embodiment that are the same as the reference numerals in the previously described embodiment refer to the same components as those in the previously described embodiment unless otherwise specified.

Figure 9:
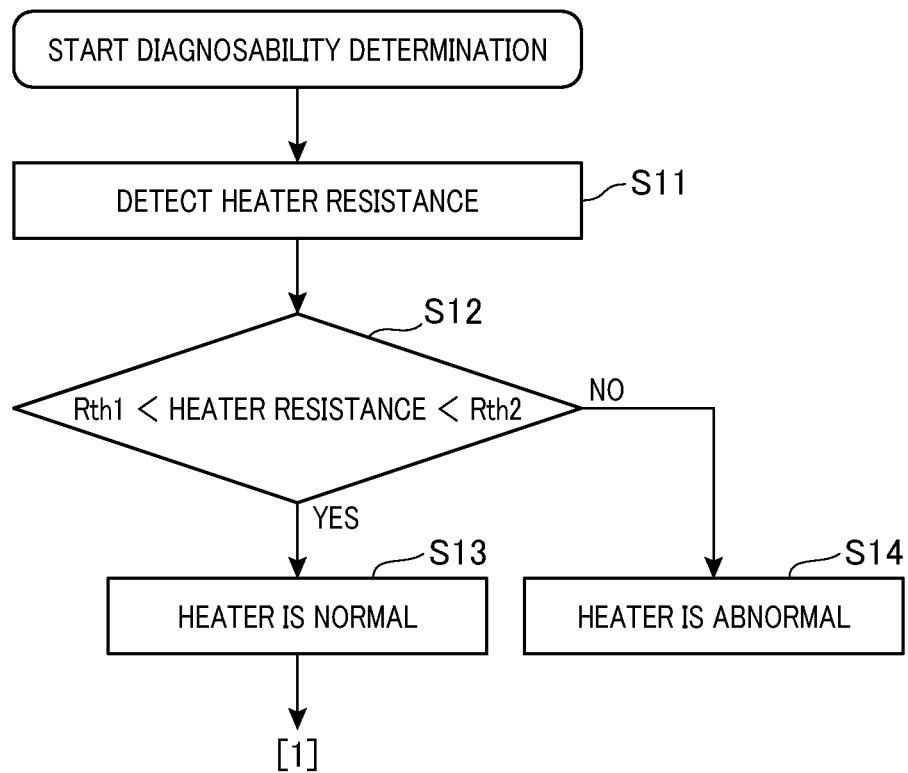
FIG. 9 is a flowchart of a diagnosability determining process performed by a diagnosability determining section included in a cover state diagnosing section of an exhaust gas sensor according to a second embodiment.
Figure 10:
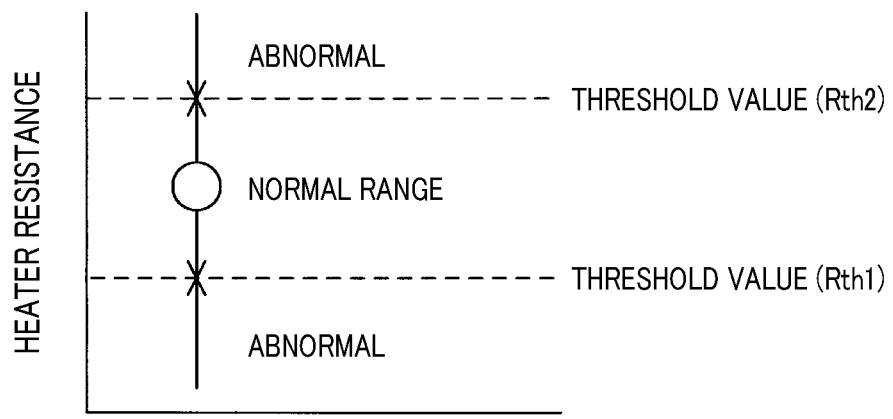
FIG. 10 is a graph showing the relationship between a normal range of the heater resistance and resistance threshold values used by the diagnosability determining section of the cover state diagnosing section according to the second embodiment.

FIG. 9 corresponds to step S1 of FIG. 6. When the diagnosability determining process of the cover state diagnosis is started, first, at step S11, the resistance value of the heating section 41 of the heater 4 (hereinafter, simply referred to as the heater resistance as required) is detected as an index representing the operating state of the heater 4. Subsequently, at step S12, the detected heater resistance is compared with predetermined resistance threshold values Rth1 and Rth2 to determine, as shown in FIG. 10, whether the detected heater resistance is in a normal range defined by the resistance threshold value Rth1, which is the lower limit, and the resistance threshold value Rth2, which is the upper limit (that is, Rth1<heater resistance<Rth2).

The heater resistance can be calculated by detecting the current that flows through the heating section 41 of the heater 4 using, for example, a non-illustrated heater resistance detection circuit, when a predetermined voltage is applied through the detection lead 44 (that is, heater resistance=applied voltage/detected current).

The heater 4 is made of a conductive material containing, for example, noble metal. If the heater 4 is continuously or intermittently heated repeatedly in accordance with the operation of the sensor element 1, the heater resistance changes due to, for example, aggregation of the noble metal material. If the change becomes significant, the heater no longer functions properly, and the accuracy of the cover state diagnosis is also decreased.

For this reason, for example, the heater resistance in the initial state is measured in advance, and the lower limit value of the normal range based on the initial resistance is stored as the resistance threshold value Rth1. Furthermore, the upper limit value of the normal range, which is the resistance threshold value Rth2, can be set using the change amount of the heater resistance due to, for example, deterioration with age, with respect to the resistance threshold value Rth1. If the measured value of the heater resistance at the time of the determination exceeds the resistance threshold value Rth2, it is determined that the heater 4 is not functioning properly, and the following determination process is not performed.

In this case, the change amount for setting the resistance threshold value Rth2 can be set as required and may be obtained as, for example, a change amount that corresponds to a predetermined percentage of the initial resistance.

If the outcome of step S12 is positive, the process proceeds to step S13, and it is determined that the operating state of the heater 4 is normal. After that, the process proceeds to [1] Determination of surrounding environmental state.

If the outcome of step S12 is negative, the process proceeds to step S14. In this case, it is determined that the operating state of the heater 4 is abnormal, and the present routine is terminated, so that the cover state diagnosis is not performed.

Figure 11:
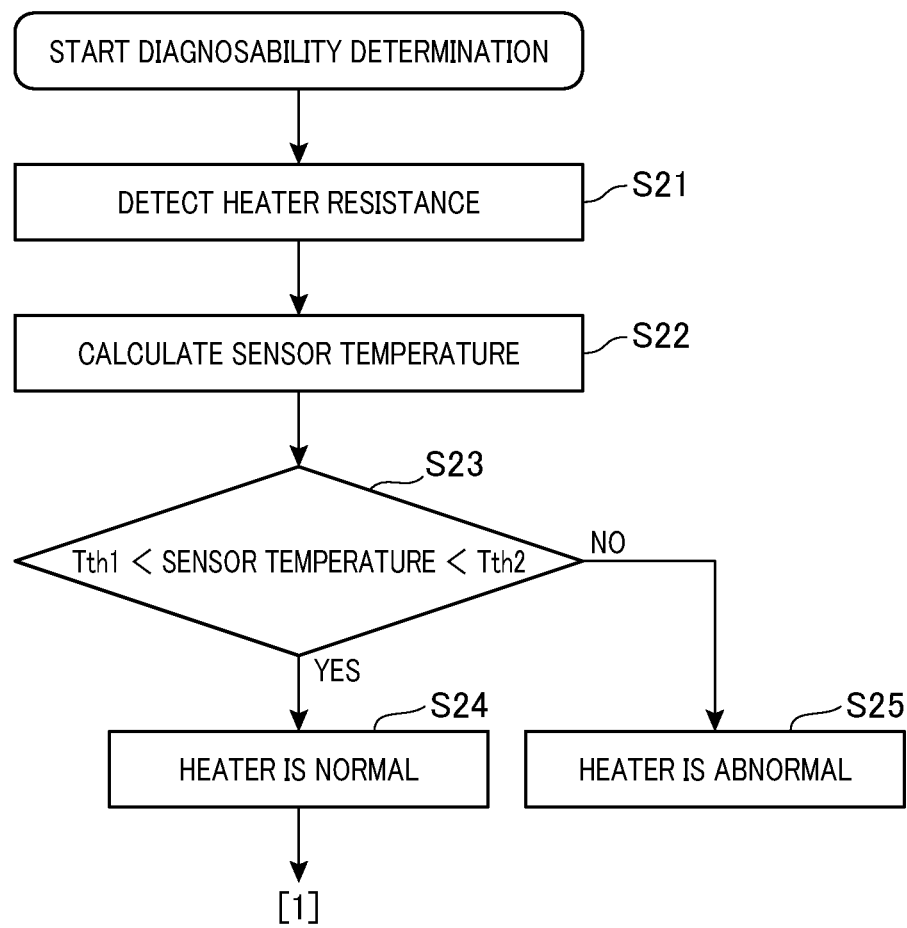
FIG. 11 is a flowchart showing part of the diagnosability determining process performed by a diagnosability determining section of a cover state diagnosing section in an exhaust gas sensor according to a modification of the second embodiment.

Alternatively, as shown in FIG. 11, the temperature of the sensor element 1 based on the heater resistance may be used as an index indicating the operating state of the heater 4.

In this case, when the diagnosability determining process is started, first, at step S21, the heater resistance is detected in the same manner as in step S11 of FIG. 9. Subsequently, at step S22, for example, the temperature of the detection section 2 of the sensor element 1 is calculated using the detected heater resistance in accordance with the relationship between the heater resistance and the sensor temperature shown in FIG. 12.

Figure 12:
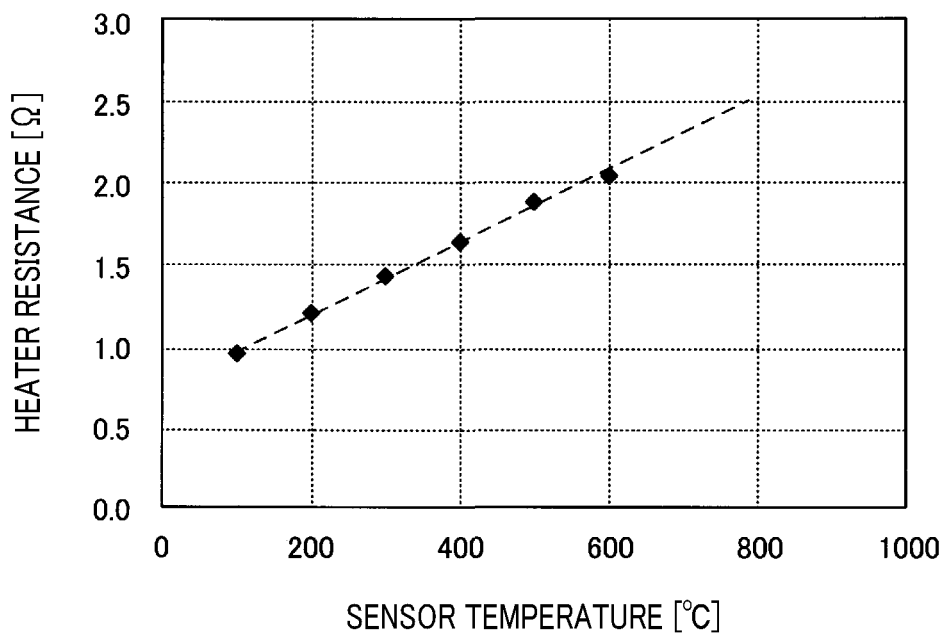
FIG. 12 is a graph showing the relationship between the heater resistance and the sensor temperature used by the diagnosability determining section of the cover state diagnosing section according to the modification of the second embodiment.

In this case, as shown in FIG. 12, if the sensor temperature increases by the influence of the surrounding environment or the like, the heater resistance increases. Thus, the sensor temperature can be indirectly detected using the heater resistance by previously storing these relationships as, for example, a map.

Figure 13:
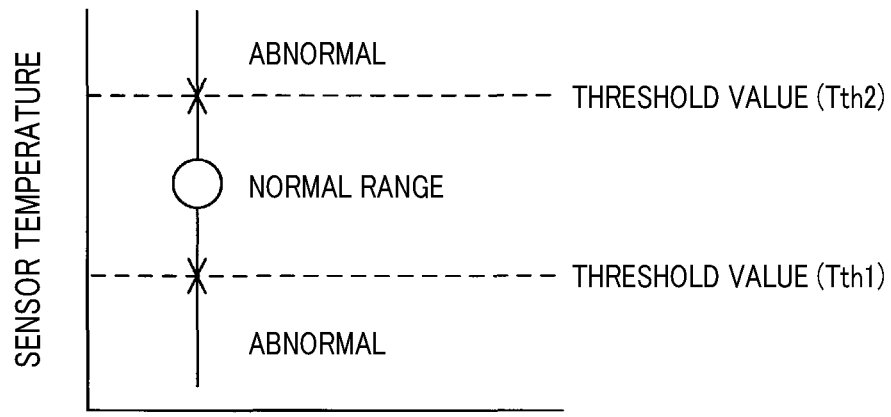
FIG. 13 is a graph showing the relationship between a normal range of the sensor temperature and resistance threshold values used by the diagnosability determining section of the cover state diagnosing section according to the modification of the second embodiment.

Furthermore, at step S23, the calculated sensor temperature is compared with predetermined temperature threshold values Tth1 and Tth2 based on a reference temperature, and as shown in FIG. 13, it is determined whether the calculated sensor temperature is in a normal range defined by the temperature threshold value Tth1, which is the lower limit, and the temperature threshold value Tth2, which is the upper limit, (that is, Tth1<sensor temperature<Tth2).

The reference temperature as used herein is, for example, the temperature of the exhaust gas around the sensor element 1 detected by the temperature sensor 103. In a state in which the heater control process is not executed, and the temperature of the part of the exhaust gas is stable, the sensor temperature is substantially equal to the temperature of the part of the exhaust gas. That is, the sensor temperature obtained based on the heater resistance is compared with the reference temperature detected by the temperature sensor 103, and if the difference is in the specified range, the heater 4 is determined to be functioning properly. Given these factors, by setting the predetermined temperature threshold values Tth1 and Tth2 taking into consideration the difference between the sensor temperature and the reference temperature in the normal state, the operating state of the heater 4 can be determined by comparing the sensor temperature obtained based on the heater resistance with the reference temperature detected by the temperature sensor 103.

If the outcome of step S23 is positive, the process proceeds to step S24, and it is determined that the operating state of the heater 4 is normal. After that, the process proceeds to [1] Determination of surrounding environmental state.

If the outcome of step S23 is negative, the process proceeds to step S25. In this case, it is determined that the operating state of the heater 4 is abnormal, and the present routine is terminated, so that the cover state diagnosis is not performed.

In determining the heater operating state by the method as described above, the surrounding temperature environment is preferably stable in terms of improving the detection accuracy. The heater operating state is preferably determined when the temperature of the exhaust gas is relatively low and in a stable temperature environment like in a low load environment immediately after starting the engine ENG or in a constant speed traveling condition. In that case, the process promptly proceeds to the subsequent surrounding environment determining process and the cover state diagnosis.

If it is determined that the operating state is normal at step S13 in FIG. 9, the process subsequently proceeds to the determination of the surrounding environmental state in FIG. 14. The same applies to the case when it is determined that the operating state is normal at step S24 in FIG. 11.

Figure 14:
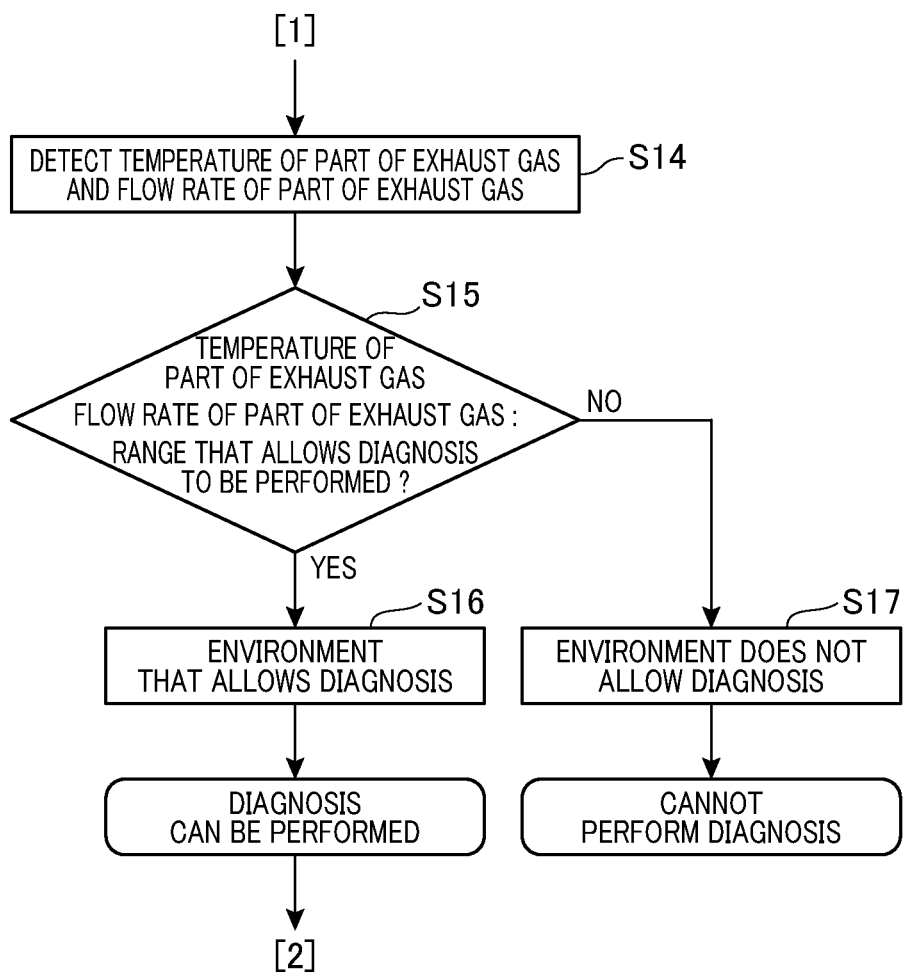
FIG. 14 is a flowchart showing part of a heater information determining process performed by the diagnosability determining section of the cover state diagnosing section in the exhaust gas sensor according to the second embodiment.

FIG. 14 corresponds to step S2 in FIG. 6. First, at step S14, the temperature of the part of the exhaust gas and the flow rate of the part of the exhaust gas, which are indexes indicating the surrounding environmental state, are detected. The temperature of the part of the exhaust gas is the temperature of the exhaust gas around the sensor and is detected by the temperature sensor 103. The flow rate of the part of the exhaust gas is the flow rate of the exhaust gas around the sensor and is calculated from, for example, the intake air amount detected by the non-illustrated air flow meter described above and the cross-sectional area information on the exhaust gas pipe 101 besides the temperature of the part of the exhaust gas.

Figure 15:
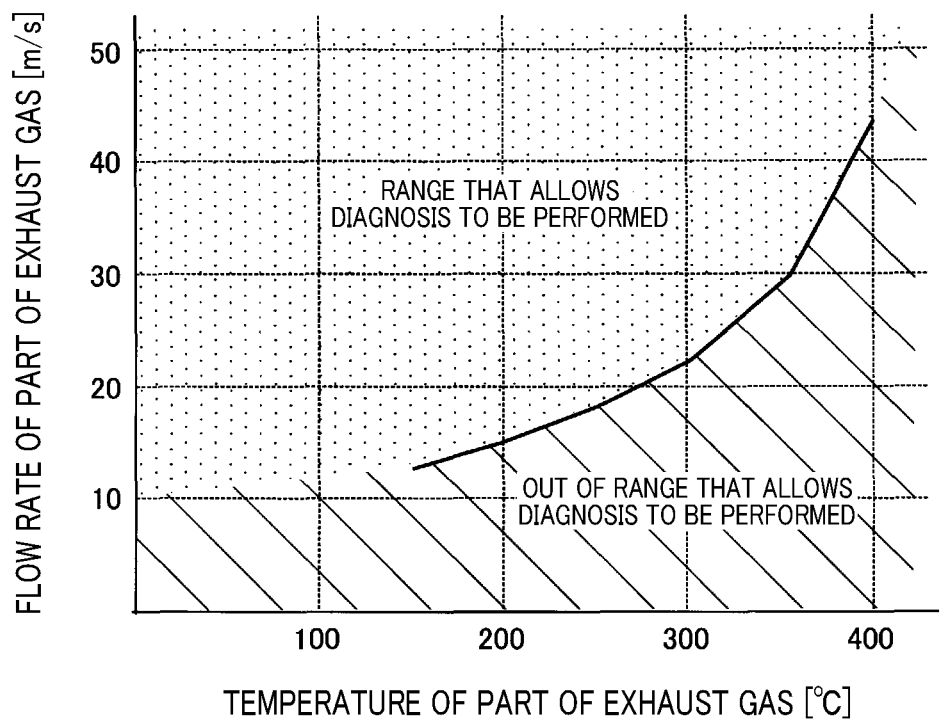
FIG. 15 is a graph showing the relationship between the flow rate of the part of the exhaust gas and the temperature of the part of the exhaust gas used by the diagnosability determining section of the cover state diagnosing section according to the second embodiment.

At step S15, it is determined whether the detected temperature of the part of the exhaust gas and flow rate of the part of the exhaust gas are within, for example, a range that allows the diagnosis to be performed as shown in FIG. 15. In general, whether there is a fault in the element cover 3 is more easily detected as the difference in the temperature fluctuation caused by how the gas hits the sensor element is increased. For this reason, as the conditions for diagnosing the state of the cover, the temperature of the part of the exhaust gas is desirably low and the flow rate of the part of the exhaust gas is desirably high. For example, if the temperature of the part of the exhaust gas is in the range of about 150° C. to 400° C., the range of the flow rate of the part of the exhaust gas in which the diagnosis can be performed is increased as the temperature of the part of the exhaust gas is decreased (for example, when the temperature of the part of the exhaust gas is 150° C., the flow rate of the part of the exhaust gas is about 15 m/s to 40 m/s).

Previously storing the relationship between the temperature of the part of the exhaust gas and the flow rate of the part of the exhaust gas shown in FIG. 15 as a map or the like allows determining whether the detected temperature of the part of the exhaust gas and flow rate of the part of the exhaust gas are within the range that allows the diagnosis to be performed.

If the outcome of step S15 is positive, the process proceeds to step S16. At step S16, it is determined that the surrounding environmental state allows diagnosing the state of the cover, and the accuracy of the heater information is high (that is, heater information accuracy: high). In this case, since it is determined that the diagnosis can be performed, the process subsequently proceeds to [2] Cover state diagnosis based on heater information determination.

If the outcome of step S15 is negative, the process proceeds to step S17. At step S17, it is determined that the surrounding environmental state does not allow the state of the cover to be diagnosed and the accuracy of the heater information is low (that is, heater information accuracy: low). In this case, it is determined that the diagnosis cannot be performed.

In this manner, after determining that the sensor element 1 is in a normal operating state and that the surrounding environment is suitable for diagnosing the state of the cover, the subsequent cover state diagnosis is performed, so that the diagnosis is performed with high accuracy.

Third Embodiment

In the present embodiment, other examples of the diagnosing procedure performed by the heater information determining section 62 will be described in detail using the flowcharts shown in FIGS. 16 to 18. While the heater power is used in the first embodiment, the heater duty is used in the present embodiment as the heater information for diagnosing the state of the cover. Furthermore, a method for setting a diagnosis threshold value A will be described for a case in which a fault diagnosis is performed due to, in particular, clogging of the cover as the state of the cover.

Figure 16:
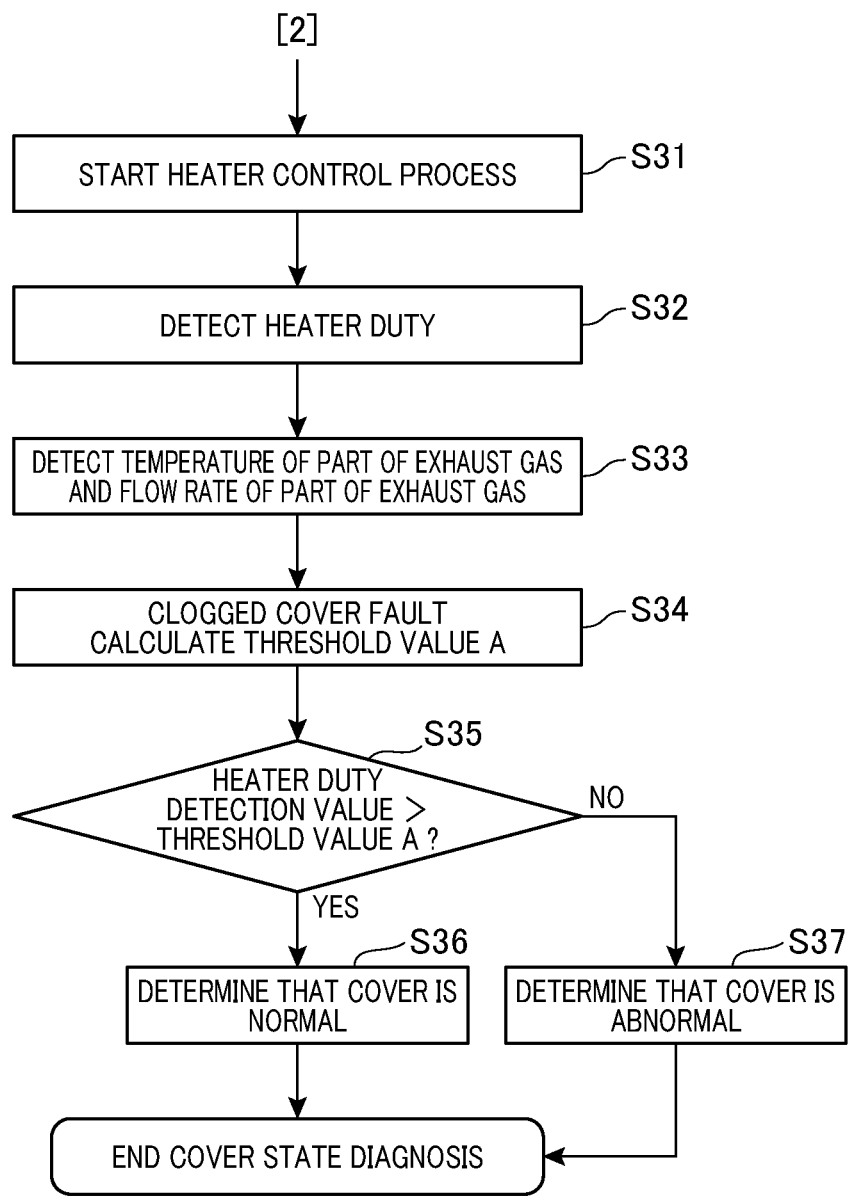
FIG. 16 is a flowchart of a heater information determining process performed by a heater information determining section of a cover state diagnosing section in an exhaust gas sensor according to a third embodiment.

FIG. 16 corresponds to step S4 and the following steps in FIG. 6. When the heater information determining process (clogged cover fault) is started, first, at step S31, the heater control process is started.

More specifically, the heating of the heater during the regeneration of the sensor element 1 after the engine is started as shown in FIG. 7 is used, and the heater duty at that time is measured at step S32. Subsequently, at step S33, the temperature of the part of the exhaust gas and the flow rate of the part of the exhaust gas are detected, and the process proceeds to step S34. At step 34, the diagnosis threshold value A corresponding to the clogged cover fault is calculated based on the detected temperature of the part of the exhaust gas and flow rate of the part of the exhaust gas.

Figure 17:
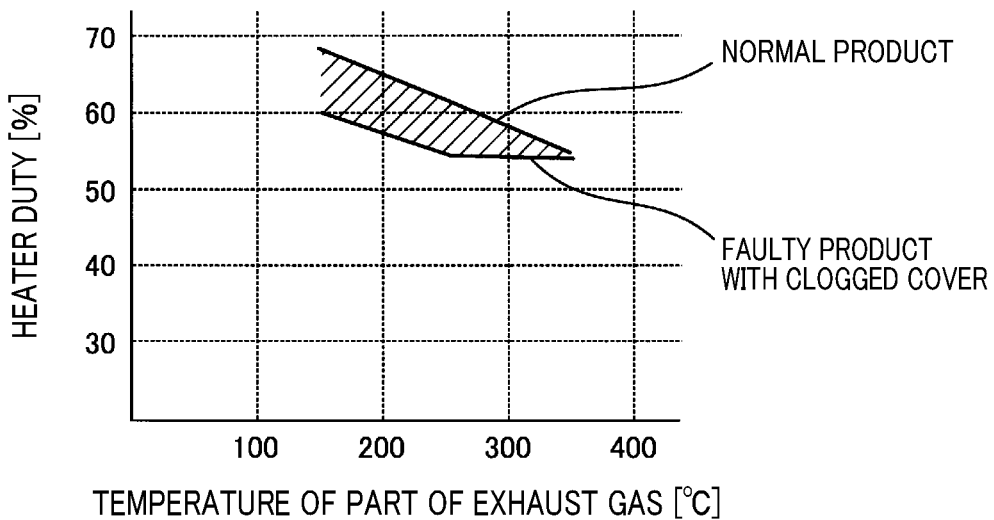
FIG. 17 is a graph showing the relationship between the heater duty and the temperature of the part of the exhaust gas for explaining the method for setting a diagnosis threshold value A used by the heater information determining section of the cover state diagnosing section according to the third embodiment.

As shown by the relationship between the heater duty and the temperature of the part of the exhaust gas in FIG. 17, if the flow rate of the part of the exhaust gas is constant (for example, 25 m/s), the heater duty decreases as the temperature of the part of the exhaust gas is increased (for example, from 150° C. to 350° C.) in the normal product.

In contrast, in a faulty product with a clogged cover, the flow rate of gas that passes through the gas flow holes 31 and 32 decreases, so that the exhaust gas is hindered from hitting against the sensor element 1. Thus, the temperature of the sensor element 1 is less likely to be decreased, and a characteristic line shifts in a direction that decreases the heater duty. Furthermore, in the range of the temperature of the part of the exhaust gas of 250° C. or more, the heater duty is substantially constant.

Figure 18:
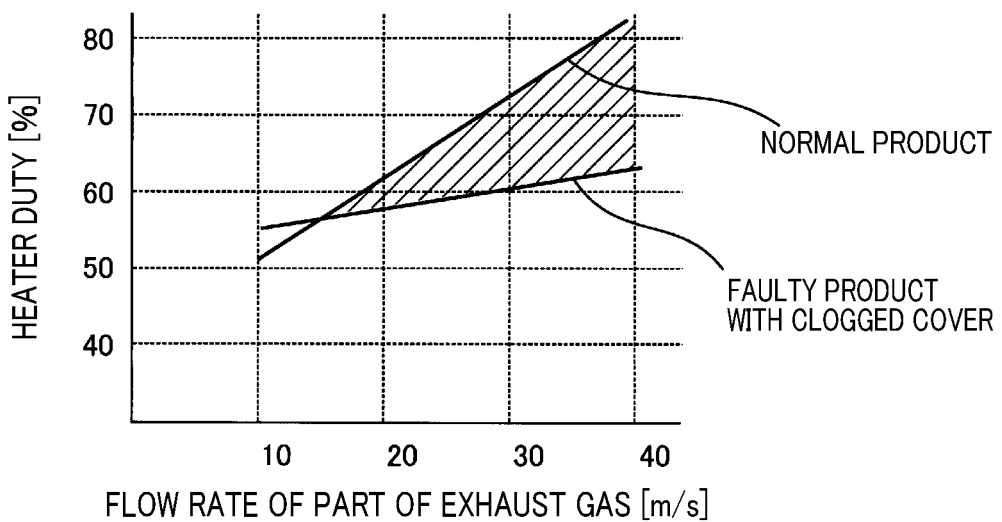
FIG. 18 is a graph showing the relationship between the heater duty and the flow rate of the part of the exhaust gas for explaining the method for setting the diagnosis threshold value A used by the heater information determining section of the cover state diagnosing section according to the third embodiment.

Additionally, as shown by the relationship between the heater duty and the flow rate of the part of the exhaust gas in FIG. 18, if the temperature of the part of the exhaust gas is constant (for example, 150° C.), the heater duty is increased as the flow rate of the part of the exhaust gas (for example, 15 m/s to 40 m/s) is increased in a normal product.

In contrast, the inclination of the characteristic line is gentler in the faulty product with a clogged cover than that of the normal product. Thus, the degree of increase in the heater duty relative to the increase in the flow rate of the part of the exhaust gas is decreased.

With these relationships, the range surrounded by the characteristic lines of the normal product and the faulty product with a clogged cover is set as the range in which the diagnosis threshold value A can be set. The heater duty, which serves as the diagnosis threshold value A, can be set for each combination of the temperature of the part of the exhaust gas and the flow rate of the part of the exhaust gas.

As an example shown in Table 1 given below, the diagnosis threshold value A is set to a greater value as the temperature of the part of the exhaust gas is decreased and the flow rate of the part of the exhaust gas is increased. The relationship is obtained by previously conducting tests or the like (for example, refer to Test Example 1, which will be discussed below). The threshold value map or the threshold value calculation formula based on the test results are stored to be used for diagnosing the state of the cover.

TABLE 1

| Temperature of part of exhaust gas (° C.) | Flow rate of part of exhaust gas (m/s) | | | | | | |
|---|---|---|---|---|---|---|---|
| | 10 | 15 | 20 | 25 | 30 | 35 | 40 |
| 150 | — | 57% | 61% | 64% | 68% | 71% | 75% |
| 200 | — | — | 59% | 61% | 64% | 67% | 70% |
| 250 | — | — | 56% | 57% | 60% | 62% | 64% |
| 300 | — | — | — | 56% | 58% | 60% | 62% |
| 350 | — | — | — | — | — | 58% | 59% |
| 400 | — | — | — | — | — | — | 58% |

Subsequently, at step S35, it is determined whether the detected heater duty is greater than the calculated diagnosis threshold value A (that is, heater duty detection value>diagnosis threshold value A?). If the outcome of step S35 is positive, it is determined that a clogged cover fault has not occurred, and the process proceeds to step S36. At step S36, it is determined that the cover is normal, and the clogged cover fault diagnosis is terminated.

If the outcome of step S35 is negative, it is determined that the clogged cover fault has occurred, and the process proceeds to step S37. At step S37, it is determined that the cover is abnormal, and the clogged cover fault diagnosis is terminated.

In this manner, the heater control process is performed using the heater 4 in the normal operating state, and the temperature of the part of the exhaust gas and the flow rate of the part of the exhaust gas are detected in the surrounding environment suitable for the diagnosis to calculate the diagnosis threshold value A. Thus, the state of the cover is diagnosed with high accuracy.

Fourth Embodiment

In the present embodiment, other examples of the diagnosing procedure performed by the heater information determining section 62 will be described in detail using the flowcharts shown in FIGS. 19 to 21. In the present embodiment also, like the first embodiment, the heater duty is used as the heater information for diagnosing the state of the cover. A fault diagnosis due to a detached cover is performed in addition to the clogged cover as the state of the cover. A method for setting diagnosis threshold values A and B in such a case will be described.

Figure 19:
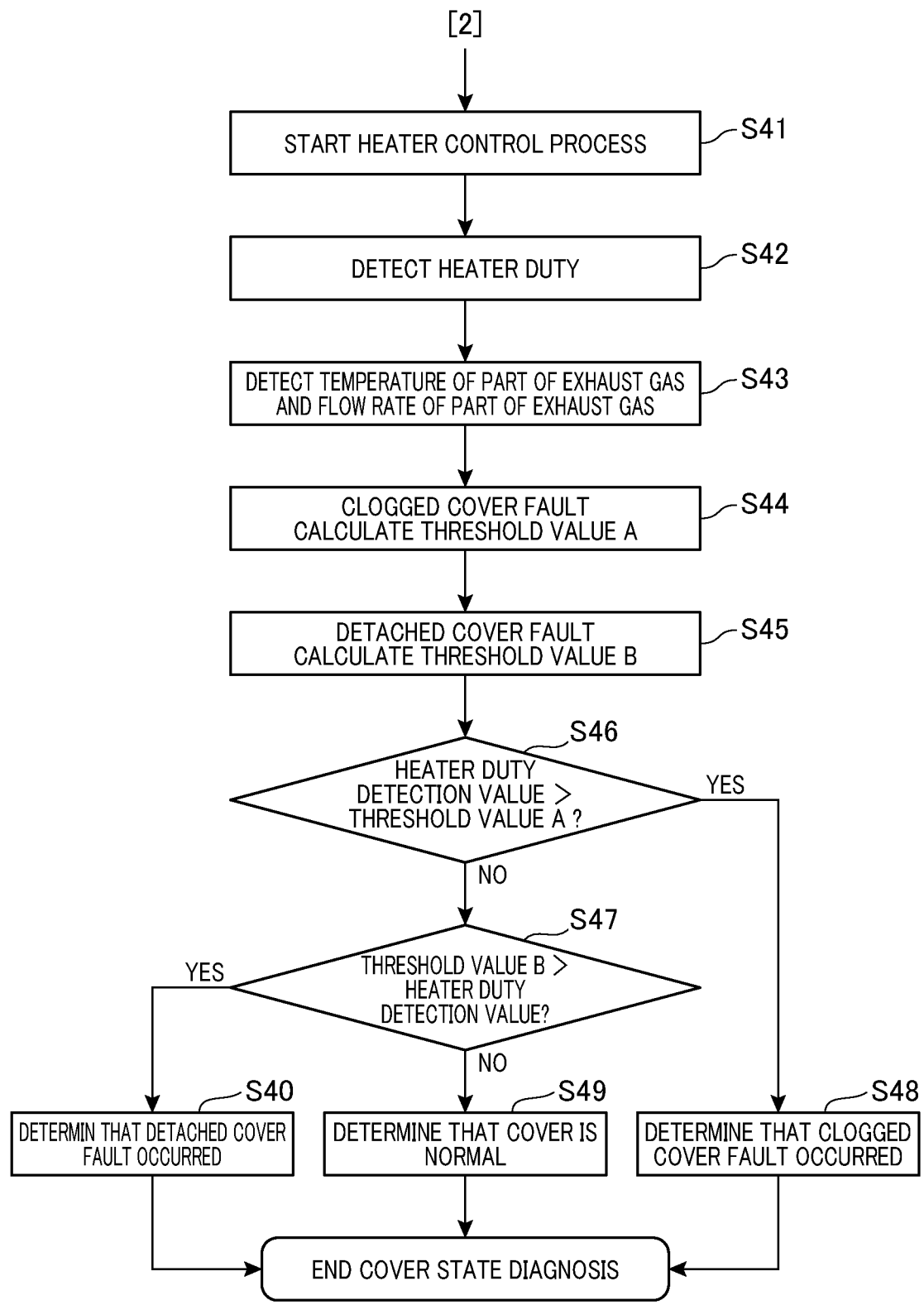
FIG. 19 is a flowchart of a heater information determining process performed by a heater information determining section of a cover state diagnosing section in an exhaust gas sensor according to a fourth embodiment.

FIG. 19 corresponds to step S4 and the following steps in FIG. 6. When the heater information determining process (clogged cover fault) is started, first, at step S41, the heater control process is started.

More specifically, the heating of the heater during the regeneration of the sensor element 1 after the engine is started as shown in FIG. 7 is used, and the heater duty at that time is measured at step S42. Subsequently, at step S43, the temperature of the part of the exhaust gas and the flow rate of the part of the exhaust gas are detected, and the process proceeds to step S44. At step S44, the diagnosis threshold value A corresponding to the clogged cover fault is calculated based on the detected temperature of the part of the exhaust gas and flow rate of the part of the exhaust gas. The method for setting the diagnosis threshold value A is the same as that in the third embodiment.

Furthermore, at step S45, the diagnosis threshold value B corresponding to the detached cover fault is calculated based on the detected temperature of the part of the exhaust gas and flow rate of the part of the exhaust gas.

Figure 20:
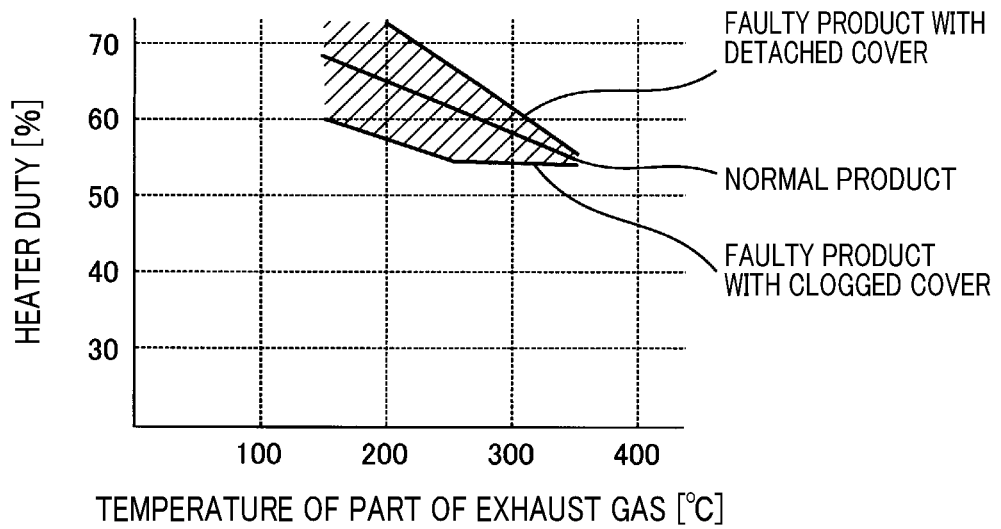
FIG. 20 is a graph showing the relationship between the heater duty and the temperature of the part of the exhaust gas for explaining the method for setting diagnosis threshold values A and B used by the heater information determining section of the cover state diagnosing section according to the fourth embodiment.

As shown by the relationship between the heater duty and the temperature of the part of the exhaust gas in FIG. 20, if the flow rate of the part of the exhaust gas is constant (for example, 25 m/s), the temperature of the sensor element 1 is easily decreased since the exhaust gas hits the sensor element 1 more easily in a faulty product with a detached cover than in a normal product. This shifts the characteristic line in a direction to increase the heater duty.

Figure 21:
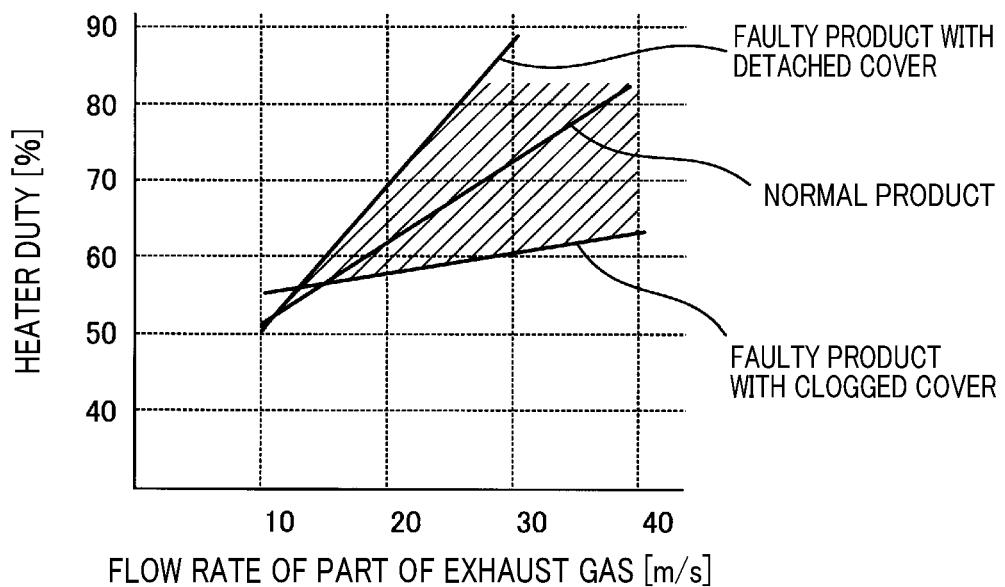
FIG. 21 is a graph showing the relationship between the heater duty and the flow rate of the part of the exhaust gas for explaining the method for setting the diagnosis threshold values A and B used by the heater information determining section of the cover state diagnosing section according to the fourth embodiment.

Additionally, as shown by the relationship between the heater duty and the flow rate of the part of the exhaust gas in FIG. 21, if the temperature of the part of the exhaust gas is constant (for example, 150° C.), the inclination of the characteristic line is increased in a faulty product with a detached cover than in a normal product. Thus, the degree of increase in the heater duty relative to the increase in the flow rate of the part of the exhaust gas is increased.

With these relationships, the range surrounded by the characteristic lines of the normal product and the faulty product with a clogged cover is set as the range in which the diagnosis threshold value B can be set. The heater duty, which serves as the diagnosis threshold value B, can be set for each combination of the temperature of the part of the exhaust gas and the flow rate of the part of the exhaust gas.

As an example shown in Table 2 given below, the diagnosis threshold value B is greater than the diagnosis threshold value A for the same combination of the temperature of the part of the exhaust gas and the flow rate of the part of the exhaust gas and is set to a greater value as the temperature of the part of the exhaust gas is decreased and the flow rate of the part of the exhaust gas is increased. The relationship is stored as the threshold value map or the threshold value calculation formula and is used for diagnosing the state of the cover.

TABLE 2

| Temperature of part of exhaust gas (° C.) | Flow rate of part of exhaust gas (m/s) | | | | | | |
|---|---|---|---|---|---|---|---|
| | 10 | 15 | 20 | 25 | 30 | 35 | 40 |
| 150 | — | 59% | 66% | 74% | 80% | 90% | 98% |
| 200 | — | — | 62% | 69% | 75% | 84% | 91% |
| 250 | — | — | 57% | 64% | 69% | 78% | 85% |
| 300 | — | — | — | 60% | 65% | 73% | 79% |
| 350 | — | — | — | — | — | 70% | 76% |
| 400 | — | — | — | — | — | — | 72% |

Subsequently, at step S46, it is determined whether the detected heater duty is greater than the calculated diagnosis threshold value A (that is, heater duty detection value>diagnosis threshold value A?). If the outcome of step S46 is positive, it is determined that the clogged cover fault has not occurred, and the process proceeds to step S47. If the outcome of step S46 is negative, it is determined that the clogged cover fault has occurred, and the process proceeds to step S48. At step S48, it is determined that the clogged cover fault has occurred, and the diagnosis is terminated.

At step S47, it is determined whether the detected heater duty is smaller than the calculated diagnosis threshold value B (that is, heater duty detection value<diagnosis threshold value B?). If the outcome of step S47 is positive, it is determined that the detached cover fault has not occurred, and the process proceeds to step S49. At step S49, it is determined that the cover is normal, and the diagnosis is terminated. If the outcome of step S47 is negative, it is determined that the detached cover fault has occurred, and the process proceeds to step S40. At step S40, it is determined that the detached cover fault has occurred, and the diagnosis is terminated.

In this manner, the heater control process is performed using the heater 4 in the normal operating state, and the temperature of the part of the exhaust gas and the flow rate of the part of the exhaust gas are detected in the surrounding environment suitable for the diagnosis to calculate the diagnosis threshold value A and the diagnosis threshold value B. Thus, the state of the cover is diagnosed with high accuracy.

Fifth Embodiment

In the present embodiment, another example of the determining procedure performed by the diagnosability determining section 61 of the cover state diagnosing section 6 will be described using the flowchart shown in FIG. 22.

The present embodiment refers to a case in which the DPF 102 (or GPF) is located upstream of the sensor body S1 of the exhaust gas sensor S, and the determining of the diagnosability determining section 61 is performed taking into consideration the increase in the temperature due to regeneration of, for example, the DPF 102 as the surrounding environmental state.

Figure 22:
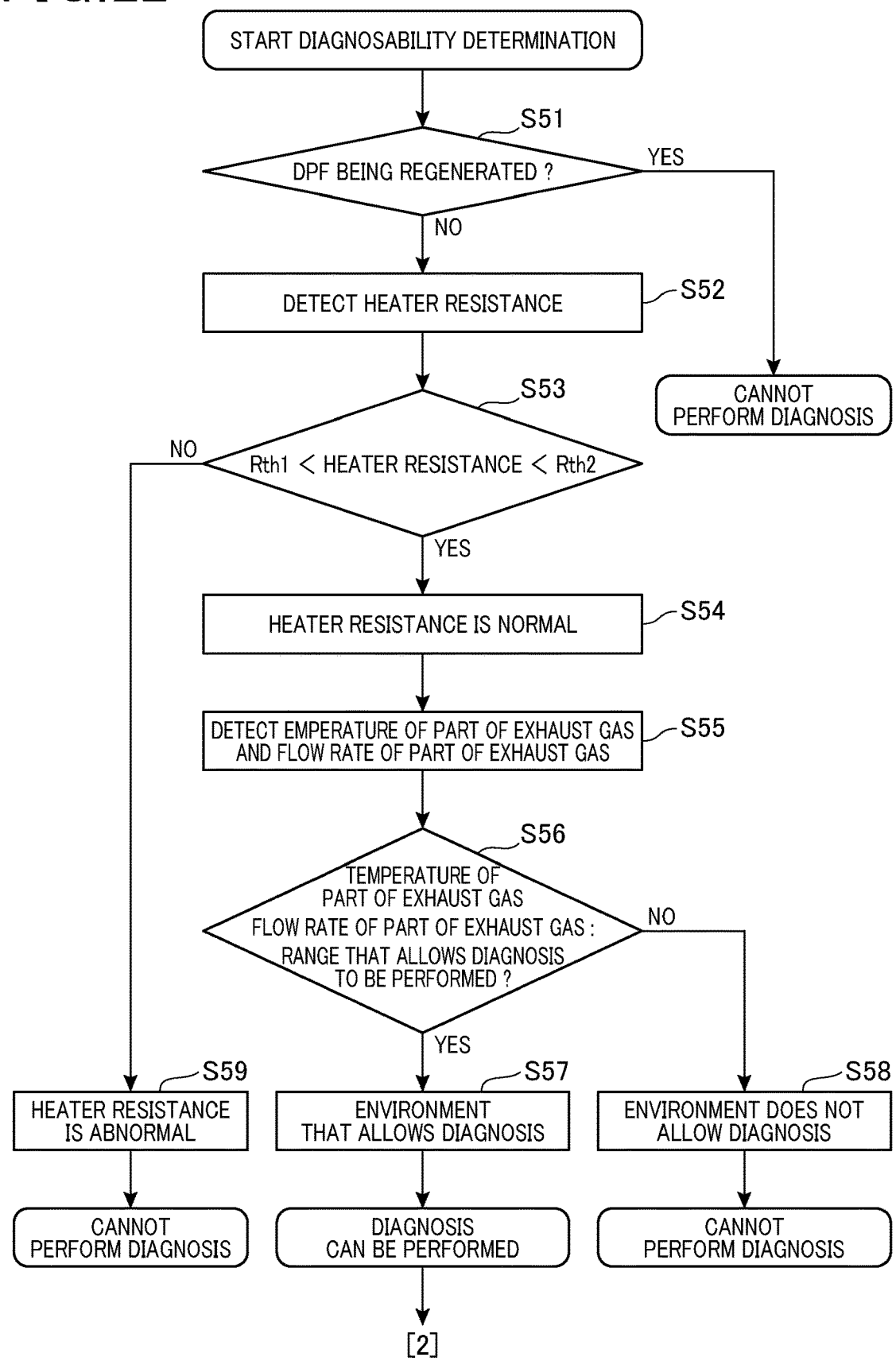
FIG. 22 is a flowchart of a heater information determining process performed by a heater diagnosability diagnosing section of a cover state diagnosing section in an exhaust gas sensor according to a fifth embodiment.

In FIG. 22, when the diagnosability determining process is started, first, at step S51, it is determined whether the DPF 102 is being regenerated (that is, regeneration of DPF being performed?). If the outcome of step S51 is negative, the process proceeds to step S52. If the outcome of step S51 is positive, regeneration is being performed to burn the PM accumulated in the DPF 102, and the temperature of the gas around the sensor element 1 located downstream of the DPF 102 may be increased. Thus, it is determined that the diagnosis cannot be performed, and the following cover state diagnosis is not performed.

At step S52, the heater resistance, which is an index indicating the operating state of the heater 4, is detected. Subsequently, at step S53, it is determined whether the detected heater resistance is within the normal range defined by the resistance threshold value Rth1, which is the lower limit, and the resistance threshold value Rth2, which is the upper limit (that is, Rth1<heater resistance<Rth2). If the outcome of step S53 is positive, the process proceeds to step S54. At step S54, it is determined that the operating state of the heater 4 is normal, and the process proceeds to step S55. If the outcome of step S53 is negative, the process proceeds to step S59. At step S59, it is determined that the diagnosis cannot be performed due to the abnormality in the heater resistance, and the subsequent cover state diagnosis is not performed.

At step S55, the temperature of the part of the exhaust gas and the flow rate of the part of the exhaust gas are detected for determining the surrounding environmental state, and the process proceeds to step S56. At step S56, it is determined whether the temperature of the part of the exhaust gas and the flow rate of the part of the exhaust gas are within the range that allows the diagnosis to be performed. If the outcome of step S56 is positive, the process proceeds to step S57, and it is determined that the surrounding environmental state is in the diagnosable zone (that is, heater information accuracy: high). In this case, the diagnosis can be performed, and the process proceeds to [2] Cover state diagnosis based on heater information determination. If the outcome of step S56 is negative, the process proceeds to step S58. At step S58, it is determined that the surrounding environmental state is out of the diagnosable zone (that is, heater information accuracy: low), and the subsequent cover state diagnosis is not performed.

In this manner, since the diagnosability determining section 61 determines the regeneration of, for example, the DPF 102 prior to detecting the heater information, the subsequent cover state diagnosis is efficiently performed.

Test Example 1

Figure 23:
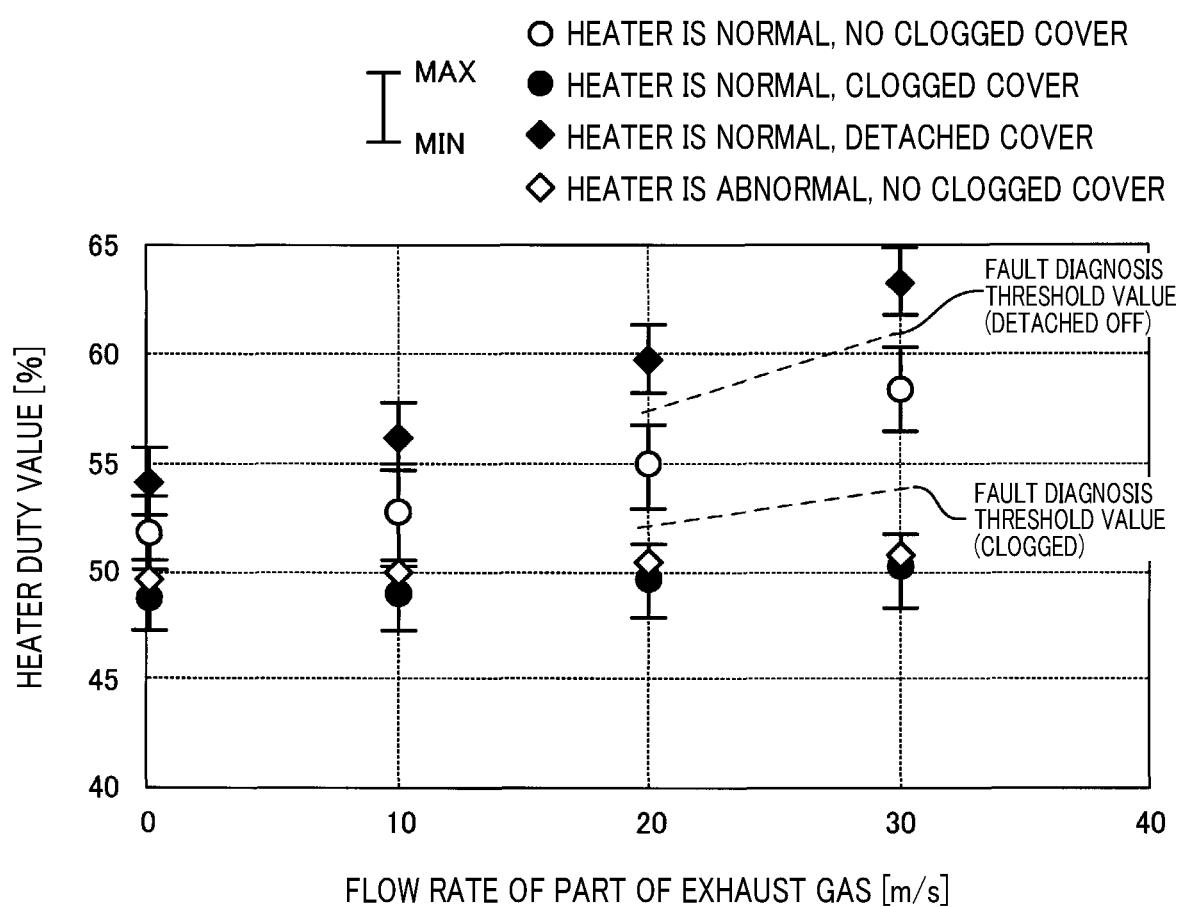
FIG. 23 is a graph showing the relationship between the heater duty and the temperature of the part of the exhaust gas during heating control performed by the heater of the exhaust gas sensor, comparing a normal product with a product with a malfunctioning cover according to Test Example 1.

As shown in FIG. 23, the relationship between the flow rate of the part of the exhaust gas and the heater duty was checked using the exhaust gas sensor S for evaluation. In the evaluation, the temperature control process of the sensor element 1 is performed by the heater control section 5 in a predetermined surrounding environmental state. The evaluation conditions were as follows.

PM sensor: a normal product (no clogging of the cover), a product with a clogged cover, and a product with a detached cover Temperature of part of exhaust gas: 200° C. to 300° C.

Flow rate of part of exhaust gas: up to 30 m/s

The evaluation was performed by conducting a test on actual equipment with a sensor body (n=5) that includes the sensor element 1 for detecting the PM and a new element cover 3 used as the normal product. The changes in the sensor temperature and the heater duty when the state of the exhaust gas was changed were compared with those of the product with a clogged cover as shown in FIG. 23. The same tests were conducted on the product with a clogged cover and the product with a detached cover. For the product with a clogged cover, the sensor body (n=5) that is the same as the normal product was used, and the element cover 3 was replaced with one in which the gas flow holes 31 and 32 were clogged. For the product with a detached cover, the element cover 3 was removed. The same test was also conducted on a product with an abnormality in the heater, that is, the product in which the heating section 41 of the heater 4 has deteriorated.

Figure 24:
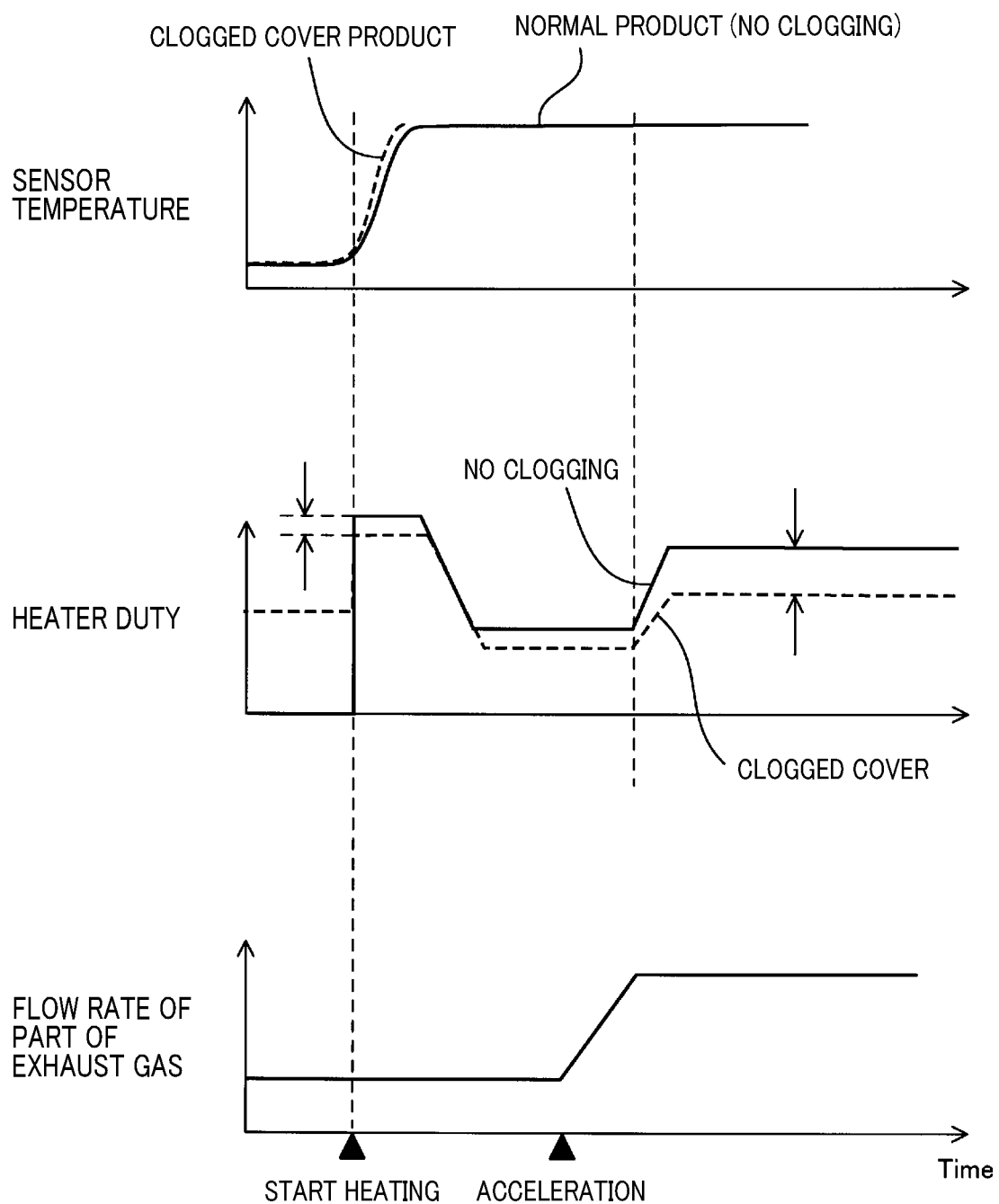
FIG. 24 is a graph showing the relationship between the sensor temperature, the heater duty, and the flow rate of the part of the exhaust gas during the heating control performed by the heater of the exhaust gas sensor, comparing a normal product with a product with a clogged cover according to Test Example 1.

As shown in FIG. 24, when heating of the normal product is started by the heater control process, the heater duty is increased. In response to the increase, the sensor temperature is gradually increased to a predetermined temperature. After that, the heater duty for maintaining the predetermined temperature is gradually decreased and becomes stable. If the flow rate of the part of the exhaust gas is increased due to acceleration of the engine ENG, the heater duty is increased again.

In contrast, although the product with a clogged cover has the same tendency as the normal product, the rising at the starting of the heating is fast, and the heater duty is generally smaller than that of the normal product since the sensor temperature is less affected by the gas hitting on the sensor element.

Thus, as shown in FIG. 23, the heater duty of the product with a clogged cover was increased, and the heater duty of the product with a detached cover was decreased with respect to the heater duty of the normal product in the entire range of the flow rate of the part of the exhaust gas. This indicates that the state of the cover can be diagnosed, and the faults caused by a clogged cover and a detached cover can be detected by setting the diagnosis threshold value A and the diagnosis threshold value B shown in the figure based on the degree of the heater duty as described above.

If there is an abnormality in the heater of the product, the state of the cover cannot be diagnosed using the heater duty since there is little difference in the heater duties between the product with an abnormality in the heater and the product with a clogged cover.

Figure 25:
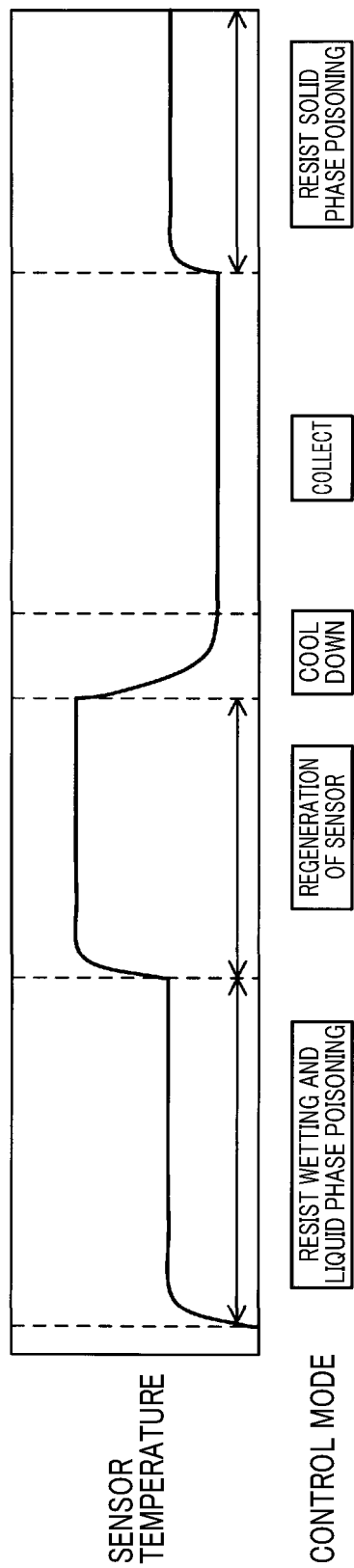
FIG. 25 is a timing chart showing heating control modes of the heater of the exhaust gas sensor and changes in the temperature of the sensor element according to Test Example 1.

FIG. 25 shows an example of the heater control process performed by the heater control section 5. For example, immediately after starting the engine ENG, the heater control section 5 controls the detection section 2 of the sensor element 1 to a temperature that repels the condensed water and inhibits liquid phase poisoning (300° C. to 600° C.). Subsequently, the heater control section 5 controls the detection section 2 of the sensor element 1 to a temperature at which the PM is burned and an ash component does not fuse (600° C. to 800° C.) and then turns off the heater 4, so that the detection section is cooled and collects the PM. After that, the temperature is controlled (to be higher than or equal to the temperature of the part of the exhaust gas) so that thermophoresis occurs and poisoning substances do not adhere.

Thus, the state of the cover can be diagnosed using the heater control process in each of the control modes.

Figure 26:
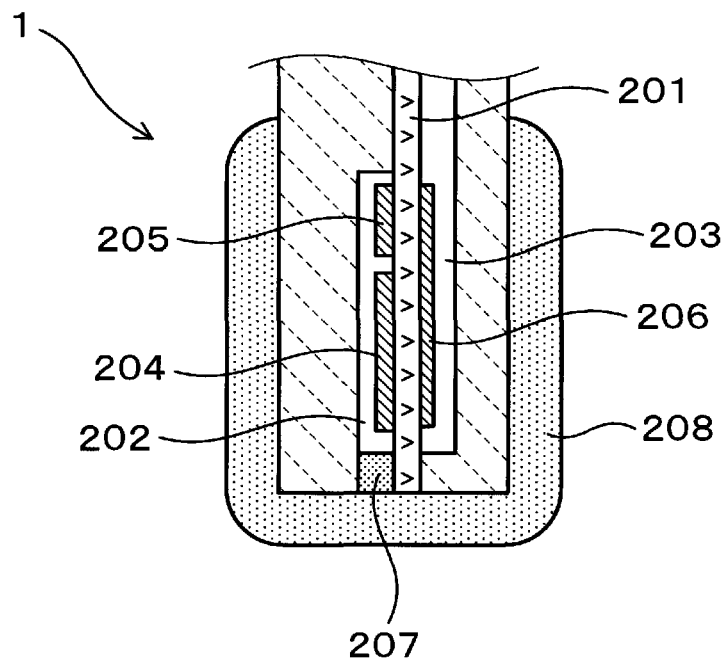
FIG. 26 is an enlarged cross-sectional view of the main section of the sensor element of the exhaust gas sensor showing another exemplary configuration.

In the above-described embodiments, the case in which the exhaust gas sensor S is used as the PM sensor was described. However, the use of the exhaust gas sensor S is not limited to the PM sensor, and the exhaust gas sensor S may be used as a gas sensor such as a NOx sensor. In this case, as shown in FIG. 26, a measured gas chamber 202, in which the exhaust gas is introduced, and an atmosphere chamber 203, in which the atmospheric air is introduced, are defined inside the sensor element 1 with a solid electrolyte 201 located in between. A pump electrode 204 and a sensor electrode 205 are located to face the measured gas chamber 202, and a reference electrode 206 is located to face the atmosphere chamber 203. A diffusion resistance layer 207, which connects the measured gas chamber 202 to the outside, is provided on the distal end face of the sensor element 1. A trap layer 208 for collecting the poisoning substances covers the surfaces of the distal end portion of the sensor element 1.

Even in a case in which the exhaust gas sensor S is used as such a gas sensor, when the heater control process of the detection section 2 is performed using the heater 4, which is included in the sensor element 1, the state of the non-illustrated element cover 3 can be diagnosed in the same manner. Furthermore, the temperature of the detection section 2 can be measured based on, for example, the relationship (for example, refer to FIG. 12) between the sensor temperature and the impedance between two electrodes (for example, the sensor electrode 205 and the reference electrode 206) located with the solid electrolyte 201 in between.

Figure 27:
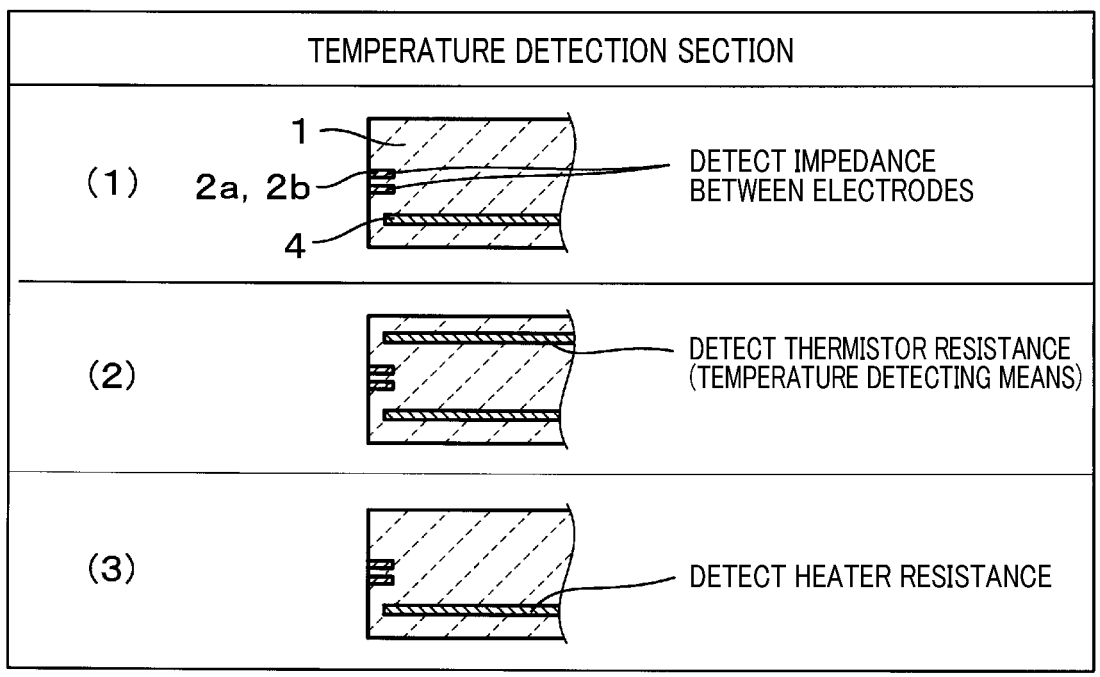
FIG. 27 is enlarged cross-sectional views illustrating exemplary configurations of the main section of the temperature detection section of the sensor element in the exhaust gas sensor.

As an example (1) shown in FIG. 27, in the sensor element 1 used for the PM sensor also, the temperature of the detection section 2 can be measured using the impedance between a pair of detection electrodes 2a and 2b. Furthermore, as an example (2), a temperature detection thermistor may be embedded in the sensor element 1, and the tempera-ture of the detection section 2 can be measured based on the relationship between the thermistor resistance and the sensor temperature. An example (3) is the example shown in the first embodiment, and the temperature of the detection section 2 is measured based on the relationship between the heater resistance of the heater 4, which is included in the sensor element 1, and the sensor temperature.

The present disclosure is not limited to the above embodiments and may be applied to various embodiments without departing from the scope of the disclosure.

For example, although the present disclosure is applied to the exhaust gas purifying system of the engine including the DPF 102 in the above-described embodiments, the system including the engine may be changed as required. Instead of vehicles, the present disclosure may be used in various applications, and the configurations of the exhaust gas sensor S and the sensor element 1 may be changed as required.

What is claimed is:

1. An exhaust gas sensor including:
a sensor element including a detection section configured to detect a specific component contained in exhaust gas;
an element cover that accommodates the sensor element and includes one or more gas flow holes for letting the exhaust gas in and out of the element cover;
a heater configured to heat the sensor element when energized;
a heater control section configured to control how the heater heats the sensor element; and
a cover state diagnosing section configured to diagnose a state of the element cover using heater information obtained when the heater is operated by the heater control section,
the cover state diagnosing section comprising a diagnosability determining section configured to, prior to diagnosing the state of the element cover using the heater information, determine whether the state of the element cover is diagnosable based on whether the heater information is accurate, the heater information being obtained from an operating state of the heater and a surrounding environmental state of the element cover;
the diagnosability determining section is configured to
perform a first determination of whether the heater is ready to operate normally based on one of resistance value information on the heater serving as an index of the operating state of the heater or temperature information on the sensor element,
perform a second determination of whether the surrounding environmental state of the element cover is in a state that allows the state of the element cover to be diagnosed based on information on a part of the exhaust gas located around the element cover serving as an index of the surrounding environmental state of the element cover, and
determine that the heater information is accurate and the state of the element cover is diagnosable in response to determining that the heater is ready to operate normally based on a result of the first determination and determining that the surrounding environmental state of the element cover is in a state that allows the state of the element cover to be diagnosed based on a result of the second determination;
wherein the diagnosability determining section is further configured to determine that the heater is ready to operate normally in response to determining that a measured value of a heater resistance as the resistance value information on the heater is within a normal range which is set based on an initial value of the heater resistance, or determining that a calculated value of sensor temperature as the temperature information on the sensor element is within a normal range which is set based on a measured value of the sensor temperature, the calculated value of the sensor temperature being calculated based on the measured value of the heater resistance.

2. The exhaust gas sensor according to claim 1, wherein the information on the part of the exhaust gas located around the element cover includes at least one of a temperature of the part of the exhaust gas and a flow rate of the part of the exhaust gas.

3. The exhaust gas sensor according to claim 1, wherein the specific component includes a particulate matter, the sensor element is covered with the element cover and located in an exhaust gas pipe through which the exhaust gas flows, a collecting filter for collecting the particulate matter is provided upstream of the element cover in a flowing direction of the exhaust gas, and the exhaust gas information includes regeneration information on the collecting filter.

4. The exhaust gas sensor according to claim 1, wherein the heater control section is configured to control energization of the heater in accordance with a target temperature of the sensor element, and the heater information includes one of the amount of electric power supplied to the heater and a controlled variable of the heater used by the heater control section.

5. The exhaust gas sensor according to claim 4, wherein the cover state diagnosing section is configured to compare a selected one of the amount of electric power supplied to the heater and the control variable of the heater used by the heater control section with a corresponding diagnosis threshold value to accordingly diagnose the state of the element cover in response to determination by the diagnosability determining section that the state of the element cover is diagnosable.

6. The exhaust gas sensor according to claim 5, wherein the diagnosis threshold value for the selected one of the amount of electric power supplied to the heater and the control variable of the heater used by the heater control section is set in accordance with the surrounding environmental state of the element cover.

7. The exhaust gas sensor according to claim 1, wherein the state of the element cover diagnosed using heater information is a clogged state of the element cover.

8. The exhaust gas sensor according to claim 1, wherein the state of the element cover diagnosed using heater information is a broken or detached state of the element cover.

9. An exhaust gas sensor including:
a sensor element including a detector configured to detect a specific component contained in exhaust gas;
an element cover that accommodates the sensor element and includes one or more gas flow holes for letting the exhaust gas in and out of the element cover;
a heater configured to heat the sensor element when energized;
a controller configured to:
control how the heater heats the sensor element;
prior to diagnosing the state of the element cover using the heater information, diagnose a state of the element cover using heater information obtained when the heater is operated by the controller, wherein the diagnosis of the state of the element cover includes a determination of whether the state of the element cover is diagnosable based on whether the heater information is accurate, the heater information being obtained from an operating state of the heater and a surrounding environmental state of the element cover;
perform a first determination of whether the heater is ready to operate normally based on one of resistance value information on the heater serving as an index of the operating state of the heater or temperature information on the sensor element,
perform a second determination of whether the surrounding environmental state of the element cover is in a state that allows the state of the element cover to be diagnosed based on information on a part of the exhaust gas located around the element cover serving as an index of the surrounding environmental state of the element cover, and
determine that the heater information is accurate and the state of the element cover is diagnosable in response to determining that the heater is ready to operate normally based on a result of the first determination and determining that the surrounding environmental state of the element cover is in a state that allows the state of the element cover to be diagnosed based on a result of the second determination;
wherein the controller is further configured to determine that the heater is ready to operate normally in response to determining that a measured value of a heater resistance as the resistance value information on the heater is within a normal range which is set based on an initial value of the heater resistance, or determining that a calculated value of sensor temperature as the temperature information on the sensor element is within a normal range which is set based on a measured value of the sensor temperature, the calculated value of the sensor temperature being calculated based on the measured value of the heater resistance.

10. The exhaust gas sensor according to claim 9, wherein the information on the part of the exhaust gas located around the element cover includes at least one of a temperature of the part of the exhaust gas and a flow rate of the part of the exhaust gas.

11. The exhaust gas sensor according to claim 9, wherein the specific component includes a particulate matter, the sensor element is covered with the element cover and located in an exhaust gas pipe through which the exhaust gas flows, a collecting filter for collecting the particulate matter is provided upstream of the element cover in a flowing direction of the exhaust gas, and the exhaust gas information includes regeneration information on the collecting filter.

12. The exhaust gas sensor according to claim 9, wherein:
the controller is further configured to control energization of the heater in accordance with a target temperature of the sensor element, and
the heater information includes one of the amount of electric power supplied to the heater and a controlled variable of the heater used by the controller.

13. The exhaust gas sensor according to claim 12, wherein the controller is further configured to:
compare a selected one of the amount of electric power supplied to the heater and the control variable of the heater used by the controller with a corresponding diagnosis threshold value to accordingly diagnose the state of the element cover in response to determination that the state of the element cover is diagnosable.

14. The exhaust gas sensor according to claim 13, wherein the diagnosis threshold value for the selected one of the amount of electric power supplied to the heater and the control variable of the heater is set in accordance with the surrounding environmental state of the element cover.

15. The exhaust gas sensor according to claim 9, wherein the state of the element cover diagnosed using heater information is a clogged state of the element cover.

16. The exhaust gas sensor according to claim 9, wherein the state of the element cover diagnosed using heater information is a broken or detached state of the element cover.

\* \* \* \* \*